US012431619B2

(12) United States Patent
Wang et al.

(10) Patent No.: US 12,431,619 B2
(45) Date of Patent: Sep. 30, 2025

(54) ANTENNA AND ELECTRONIC DEVICE

(71) Applicants: Beijing BOE Sensor Technology Co., Ltd., Beijing (CN); BOE Technology Group Co., Ltd., Beijing (CN)

(72) Inventors: Jing Wang, Beijing (CN); Yi Ding, Beijing (CN); Haocheng Jia, Beijing (CN); Zhifeng Zhang, Beijing (CN); Chuncheng Che, Beijing (CN); Hao Guo, Beijing (CN); Yan Lu, Beijing (CN); Weisi Zhou, Beijing (CN); Wenxue Ma, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,994

(22) PCT Filed: Mar. 29, 2022

(86) PCT No.: PCT/CN2022/083623

§ 371 (c)(1),
(2) Date: Mar. 23, 2023

(87) PCT Pub. No.: WO2023/184138

PCT Pub. Date: Oct. 15, 2023

(65) Prior Publication Data

US 2024/0322425 A1 Sep. 26, 2024

(51) Int. Cl.

*H01Q 1/24* (2006.01)
*H01P 1/18* (2006.01)

(Continued)

(52) U.S. Cl.

CPC ................. *H01Q 3/36* (2013.01); *H01P 1/18* (2013.01); *H01Q 1/38* (2013.01); *H01Q 21/0006* (2013.01); *H01Q 21/065* (2013.01)

(58) Field of Classification Search

CPC ............ H01Q 1/24; H01Q 1/38; H01Q 21/00; H01Q 21/0006; H01Q 21/06;

(Continued)

(56) References Cited

U.S. PATENT DOCUMENTS 5,694,134 A * 12/1997 Barnes .................... H01P 7/088 333/161
6,538,603 B1 * 3/2003 Chen ........................ H01Q 3/36 342/372

(Continued)

FOREIGN PATENT DOCUMENTS

CN 113258305 A 8/2021
CN 111490315 B 10/2021

(Continued)

*Primary Examiner* — Tho G Phan

(74) *Attorney, Agent, or Firm* — Nath, Goldberg & Meyer; Joshua B. Goldberg

(57) ABSTRACT

An antenna and an electronic device are provided, and belong to the field of communication technology. The antenna includes: a first dielectric substrate, at least one sub-array and at least one first feed structure. Each sub-array includes at least one first radiation portion, at least one phase shifter, at least one second feed structure and a reference electrode layer. Each transmission component includes a first transmission structure and a second transmission structure; the at least one first radiation portion and the at least one second feed structure are on a side of the first dielectric substrate away from the at least one transmission component. The reference electrode layer is on the first dielectric substrate. Each first feed structure includes a first feed port (Continued)

and at least one second feed port; each second feed structure includes a third feed port and at least one fourth feed port.

19 Claims, 10 Drawing Sheets

(51) Int. Cl.

| | |
|---|---|
| ***H01Q 1/38*** | (2006.01) |
| ***H01Q 3/36*** | (2006.01) |
| ***H01Q 21/00*** | (2006.01) |
| ***H01Q 21/06*** | (2006.01) |

(58) Field of Classification Search
CPC ........ H01Q 21/065; H01Q 21/08; H01Q 3/26; H01Q 3/36; H01Q 9/04; H01P 1/18
See application file for complete search history.

(56) References Cited

U.S. PATENT DOCUMENTS

| | | | | |
|---|---|---|---|---|
| 9,391,375 | B1 * | 7/2016 | Bales | H01Q 21/064 |
| 11,056,794 | B2 * | 7/2021 | Hashimoto | H01Q 1/48 |
| 11,145,983 | B1 * | 10/2021 | Tarng | H01Q 13/18 |
| 11,183,766 | B2 * | 11/2021 | Jia | H01Q 9/0457 |
| 2003/0122715 | A1 | 7/2003 | Aikawa et al. | |
| 2005/0264451 | A1 | 12/2005 | Aikawa et al. | |

FOREIGN PATENT DOCUMENTS

| | | | |
|---|---|---|---|
| CN | 113871818 | A | 12/2021 |
| CN | 113889750 | A | 1/2022 |

* cited by examiner

ANTENNA AND ELECTRONIC DEVICE

This is a National Phase Application filed under 35 U.S.C. 371 as a national stage of PCT/CN2022/083623, filed Mar. 29, 2022, the content of each of which is hereby incorporated by reference in its entirety.

TECHNICAL FIELD

The present disclosure relates to the field of communication technology, and in particular to an antenna and an electronic device.

BACKGROUND

With the development of mobile communication technology, the signal coverage becomes a focus of attention for device vendors and operators. In order to achieve a better signal coverage, operators need an antenna with an adjustable beam angle. In order to achieve coverage of a cell by a beam, a beam of an antenna of a base station is usually tilted down by a certain angle in two modes, namely, a mechanical downtilt mode and an electrical downtilt mode. The mechanical downtilt mode is that the antenna is artificially inclined down by an angle when the antenna is built, so that a certain physical angle is formed between a plane of the antenna and the ground, and thus a downtilt is formed in the beam pointing. The electrical downtilt mode is in that according to the antenna array synthesis principle for the antenna, different phases are given to different units of the antenna, so that phase differences exist among the antenna units, and thus a downtilt is formed in in a vertical direction in an antenna pattern. For the convenience of installation and maintenance, the electrical downtilt mode is widely adopted. If the downtilt of the beam of the antenna is to be changed, it is necessary to adopt a phase shifter. Most of the traditional phase shifters are mechanical phase shifters. However, most of the mechanical phase shifters are heavy and have a high profile.

SUMMARY

The present disclosure is directed to at least one of the technical problems of the prior art, and provides an antenna and an electronic device.

The embodiment of the present disclosure provides an antenna, including: a first dielectric substrate, at least one sub-array and at least one first feed structure; each sub-array includes at least one first radiation portion, at least one transmission component, at least one second feed structure and a reference electrode layer; each transmission component includes at least a first transmission structure and a second transmission structure; the at least one first radiation portion and the at least one second feed structure are on a side of the first dielectric substrate away from the at least one transmission component, and the reference electrode layer is on a side of the first dielectric substrate close to the at least one transmission component; and each first feed structure includes a first feed port and at least one second feed port; each second feed structure includes a third feed port and at least one fourth feed port; the reference electrode layer includes a plurality of first openings and a plurality of second openings therein; each fourth feed port is connected to a corresponding first radiation portion; and orthographic projections of any two of one first opening, one first transmission structure, one second feed port corresponding to each other on the first dielectric substrate overlap with each other; and orthographic projections of any two of one second opening, one second transmission structure, and one third feed port corresponding to each other on the first dielectric substrate overlap with each other.

In some embodiments, the antenna further includes a second dielectric substrate opposite to the first dielectric substrate, each sub-array further includes at least one second radiation portion on the second dielectric substrate, and orthographic projections of one first radiation portion and one second radiation portion corresponding to each other on the first dielectric substrate at least partially overlap with each other.

In some embodiments, the at least one second radiation portion is on a side of the second dielectric substrate away from the first dielectric substrate.

In some embodiments, each first feed structure is a one-to-two power divider, the antenna includes a plurality of sub-arrays; and every two sub-arrays arranged side by side along a first direction form a group; and two second feed ports of each one-to-two power divider are coupled to first transmission structures of two transmission components in one group of the sub-arrays through corresponding first openings, respectively.

In some embodiments, each sub-array includes two second feed structures; and fourth feed ports of two second feed structures connected to a same first radiation portion have different feed directions.

In some embodiments, an outline of each first radiation portion includes a first side and a second side opposite to each other in a first direction, and a third side and a fourth side opposite to each other in a second direction; a main body portion of each of the first side and the second side extends along the second direction, and a main body portion of each of the third side and the fourth side extends along the first direction; the second side is directly connected to the third side and the fourth side; and two fourth feed ports connected to a same first radiation portion are connected to both ends of the second side, respectively.

In some embodiments, the outline of each first radiation portion further includes a fifth side connecting the first side and the third side, and a sixth side connecting the first side and the fourth side; for the outline of each first radiation portion, an intersection point of an extension line of the first side and an extension line of the third side is a first intersection point, and an intersection point of the extension line of the first side and an extension line of the fourth side is a second intersection point; a midpoint of a line connecting a midpoint of the third side and a midpoint of the fourth side is a first midpoint; the shortest distance from the first intersection point to the fifth side is a first distance, the shortest distance from the second intersection point to the sixth side is a second distance, a distance from the first intersection point to the first midpoint is a third distance, and a distance from the second intersection point to the first midpoint is a fourth distance; and each of a ratio of the first distance to the third distance and a ratio of the second distance to the fourth distance is in a range from 2:15 to 3:14.

In some embodiments, the first side is provided with a recess portion thereon and recessed toward the second side.

In some embodiments, for each first radiation portion, there is an angle between the first direction and an extending direction of a line connecting a center of an outline of the recess portion and a midpoint of the second side, and the angle is in a range from 0° to 5°.

In some embodiments, for each first radiation portion, a ratio of the maximum distance to the minimum distance from the first side to the second side in the first direction is in a range from 25:19 to 22:19.

In some embodiments, the two second feed structures in each sub-array are symmetrically arranged with respect to a straight line extending in the first direction and passing through a midpoint of a second side of an outline of a corresponding first radiation portion as a symmetry axis.

In some embodiments, each sub-array includes two transmission components and two second feed structures; the two transmission components in the sub-array are a transmission component a and a transmission component b, respectively, and the two second feed structures are a second feed structure a and a second feed structure b, respectively; the reference electrode layer in the sub-array includes two first openings and two second openings, the two first openings are a first opening a and a first opening b, respectively, and the two second openings are a second opening a and a second opening b, respectively; each first feed structure is a one-to-two power divider; the antenna includes a plurality of sub-arrays, and every two sub-arrays arranged side by side along a first direction form a group; and each group of the sub-arrays are fed by corresponding two first feed structures, and the two first feed structures for feeding a same group of the sub-arrays are a first feed structure a and a first feed structure b, respectively; for each group of the sub-arrays, two second feed ports of the first feed structure a are coupled to the first transmission structure of the corresponding transmission component a through the corresponding first opening a, respectively; and the second transmission structure of the transmission component a is coupled to the third feed port of the corresponding second feed structure a through the corresponding second openings a, and two second feed ports of the first feed structure b are coupled to the first transmission structure of the corresponding transmission component b through the corresponding first opening b, respectively; the second transmission structure of the transmission component b is coupled to the third feed port of the corresponding second feed structure b through the corresponding second opening b.

In some embodiments, each transmission component includes a phase shifter; the phase shifter further includes a phase shifting portion connected between the first transmission structure and the second transmission structure; the phase shifting portion of the phase shifter includes a third dielectric substrate and a fourth dielectric substrate opposite to each other, a first electrode layer on a side of the third dielectric substrate close to the fourth dielectric substrate, a second electrode layer on a side of the fourth dielectric substrate close to the third dielectric substrate, and a liquid crystal layer between the first electrode layer and the second electrode layer; the third dielectric substrate is closer to the reference electrode layer than the fourth dielectric substrate; and the first electrode layer includes a first main line and a second main line, and orthographic projections of the first main line and the second main line on the third dielectric substrate overlap with an orthographic projection of the second electrode layer on the third dielectric substrate; and both ends of each of the first main line and the second main line are connected to the first transmission structure and the second transmission structure corresponding to the first main line and the second main line, respectively.

In some embodiments, each of the first main line and the second main line include a first end and a second end opposite to each other; each first transmission structure includes a first combining line, a first branch line, and a second branch line; each second transmission structure includes a second combining line, a third branch line, and a fourth branch line; orthographic projections of the first combining line and the corresponding first opening on the first dielectric substrate overlap with each other; one end of the first branch line is connected to the first end of the first main line, and the other end of the first branch line is connected to the first combining line; one end of the second branch line is connected to the first end of the second main line, and the other end of the second branch line is connected to the first combining line; orthographic projections of the second combining line and the corresponding second opening on the first dielectric substrate overlap with each other; one end of the third branch line is connected to the second end of the first main line, and the other end of the third branch line is connected to the second combining line; one end of the fourth branch line is connected to the second end of the second main line, and the other end of the fourth branch line is connected to the second combining line; and line lengths of the first branch line and the fourth branch line are the same; line lengths of the second branch line and the third branch line are the same, and the line length of the first branch line is greater than that of the second branch line.

In some embodiments, each first transmission structure and each second transmission structure are on the third dielectric substrate.

In some embodiments, the number of the first radiation portions in the at least one sub-array of the antenna is N, where N≥2, and N is an integer; and each second feed structure includes N fourth feed ports, and the N first radiation portions in the at least one sub-array of the antenna are connected to the N fourth feed ports in a one-to-one correspondence.

In some embodiments, the first dielectric substrate includes a printed circuit board.

In some embodiments, the at least one first feed structure, the at least one second feed structure and the at least one first radiation portion are in a same layer and are of a same material.

In some embodiments, the antenna further includes a housing; and the at least one sub-array and the at least one first feed structure are within a hollow space of the housing.

In some embodiments, an outline of each first radiation portion includes at least one first protrusion portion and/or at least one first groove portion.

In some embodiments, an outline of each second radiation portion includes at least one second protrusion portion and/or at least one second groove portion; when each first radiation portion includes at least one first protrusion portion and each second radiation portion includes at least one second protrusion portion, the at least one second protrusion portion is in a one-to-one correspondence with the at least one first protrusion portion; and when each first radiation portion includes at least one first groove portion and each second radiation portion includes at least one second groove portion, the at least one second groove portion is in a one-to-one correspondence with the at least one first groove portion.

The embodiment of the present disclosure provides an electronic device, including the antenna of any one of the above embodiments.

DETAIL DESCRIPTION OF EMBODIMENTS

In order to enable one of ordinary skill in the art to better understand the technical solutions of the present disclosure, the present invention will be described in further detail with reference to the accompanying drawings and the detailed description.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The term "connected", "coupled", or the like is not limited to physical or mechanical connections, but may include electrical connections, whether direct or indirect connections. The terms "upper", "lower", "left", "right", and the like are used only for indicating relative positional relationships, and when the absolute position of an object being described is changed, the relative positional relationships may also be changed accordingly.

A BALUN (balance-unbalance) component is a three-port device that can be applied in a microwave radio frequency device, and is a radio frequency transmission line transformer that converts a matching input into a differential input, and can be used for exciting a differential line, an amplifier, a wideband antenna, a balanced mixer, a balanced frequency multiplier and a modulator, a phase shifter, and any circuit design that requires a transmission for signals with a same amplitude and a phase difference of 180° on two lines. Two outputs of the BALUN component have a same amplitude and opposite phases. In the frequency domain, this means that there is a phase difference of 180° between the two outputs; in the time domain, this means that a voltage of one balanced output is a negative value of the other balanced output.

It should be noted that a transmission component in the present disclosure is configured to perform transmission of radio frequency signals. In the following examples of the present disclosure, the transmission component is described as a phase shifter, that is, the transmission component includes not only a first transmission structure and a second transmission structure, but also a phase shifting portion disposed between the first transmission structure and the second transmission structure and configured to perform a phase shift on a radio frequency signal.

Figure 1:
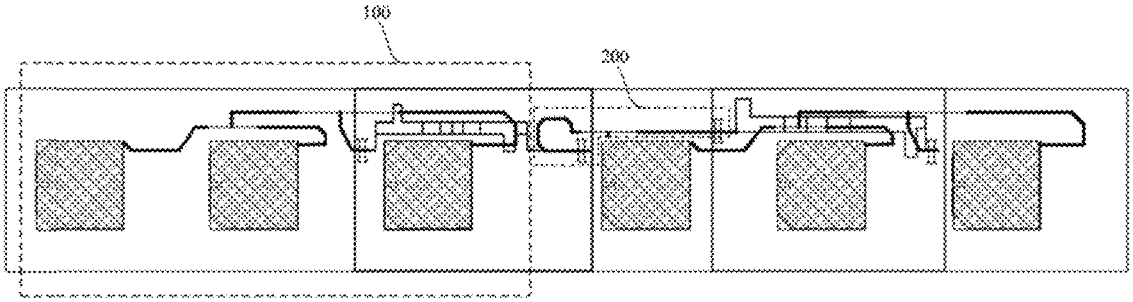
FIG. 1 is a top view of an antenna according to an embodiment of the present disclosure.
Figure 2:
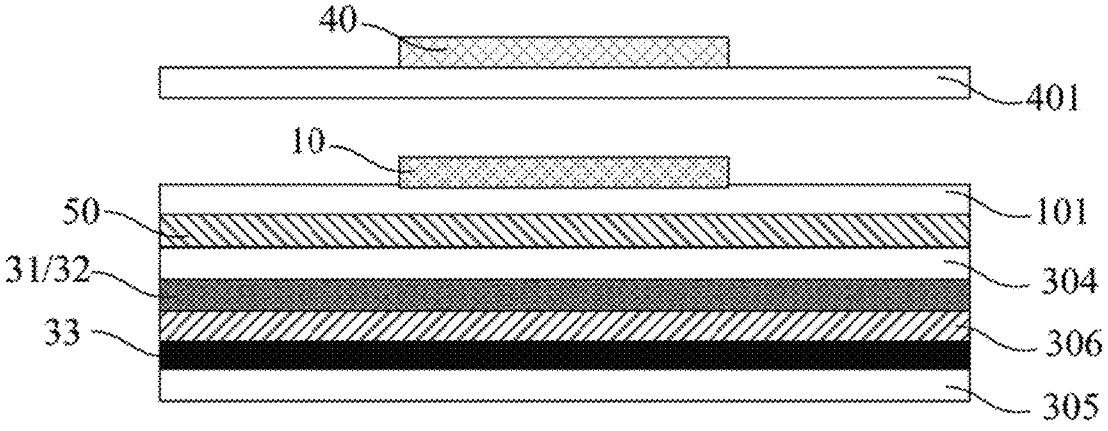
FIG. 2 is a cross-sectional view of an antenna according to an embodiment of the present disclosure.

In a first aspect, FIG. 1 is a top view of an antenna according to an embodiment of the present disclosure. FIG. 2 is a cross-sectional view of an antenna according to an embodiment of the present disclosure. As shown in FIGS. 1 and 2, embodiments of the present disclosure provide an antenna, which includes: a first dielectric substrate 101, at least one sub-array, and a first feed structure 200. Each sub-array 100 includes at least one first radiation portion 10, at least one phase shifter 30, at least one second feed structure 20 and a reference electrode layer 50.

Figure 3:
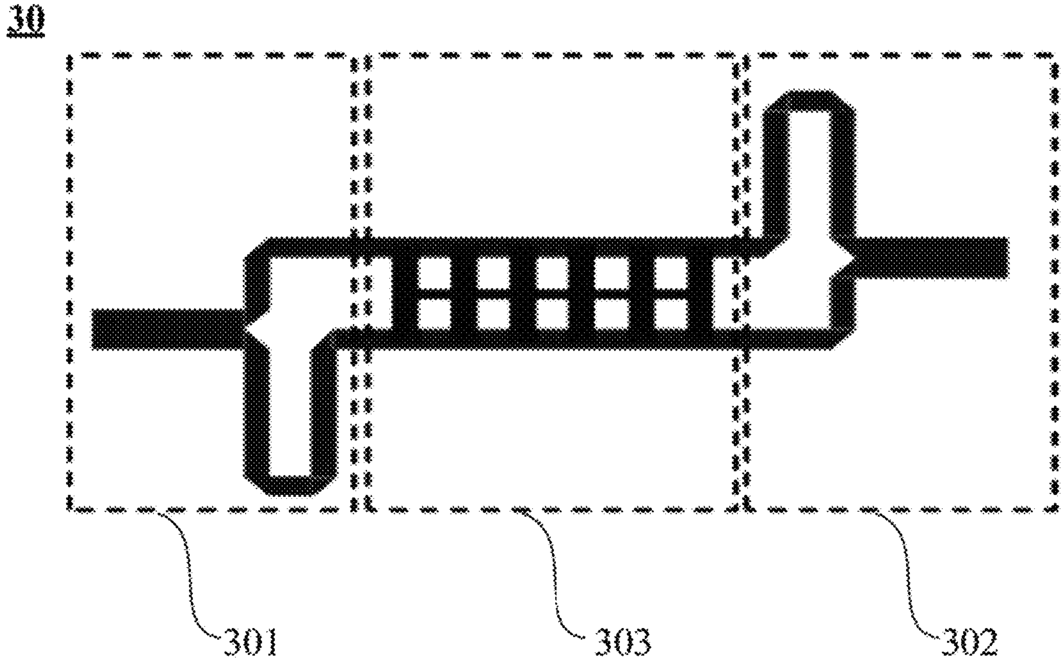
FIG. 3 is a top view of a phase shifter of the antenna shown in FIG. 1.

Specifically, FIG. 3 is a top view of a phase shifter 30 of the antenna shown in FIG. 1. As shown in FIG. 3, each phase shifter 30 includes a first transmission structure 301, a second transmission structure 302, and a phase shifting portion 303. One of the first transmission structure 301 and the second transmission structure 302 is used as an input structure for a microwave signal, and the other one is used as an output structure for the microwave signal. For example, the first transmission structure 301 is used as the input structure, the second transmission structure 302 is used as the output structure. At this time, the first transmission structure 301 feeds the microwave signal into the phase shifting portion 303, and the phase shifting portion 303 performs a phase shift on the microwave signal and then feeds out the phase-shifted microwave signal through the second transmission structure 302.

Figure 4:
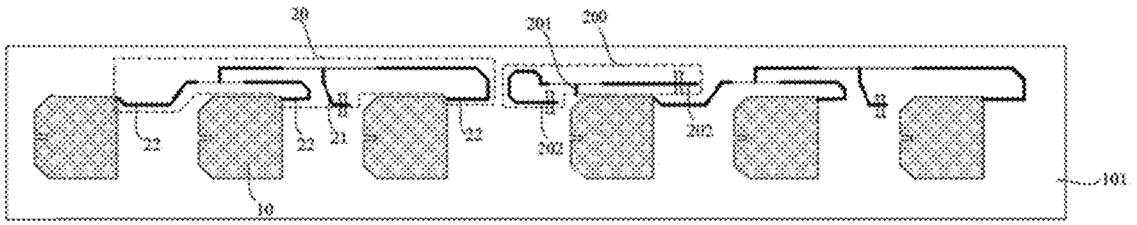
FIG. 4 is a top view of a first dielectric substrate, a first radiation portion, a first feed structure, and a second feed structure of the antenna shown in FIG. 1.

FIG. 4 is a top view of a first dielectric substrate 101, a first radiation portion 10, a first feed structure 200 and a second feed structure 20 of the antenna shown in FIG. 1. As shown in FIGS. 2 and 4, the at least one first radiation portion 10 and the at least one second feed structure 20 in each sub-array 100 are disposed on a side of the first dielectric substrate 101 away from the at least one phase shifter 30, and the reference electrode layer 50 is disposed on a side of the first dielectric substrate 101 close to the at least one phase shifter 30. The reference electrode layer 50, the at least one first radiation portion 10 and the at least one second feed structure 20 form a current loop. The reference electrode layer 50 may be a ground electrode layer for easy control.

Figure 5:
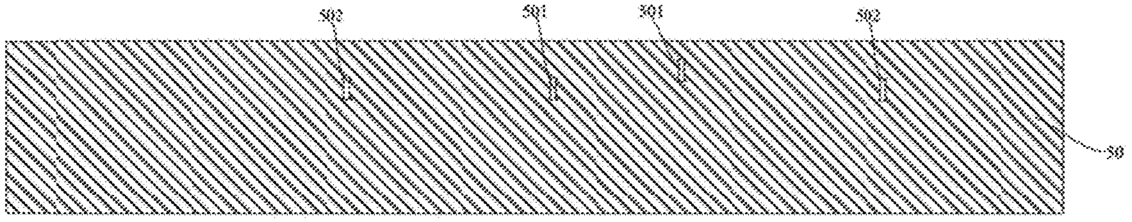
FIG. 5 is a top view of a reference electrode layer of the antenna shown in FIG. 1.
Figure 6:
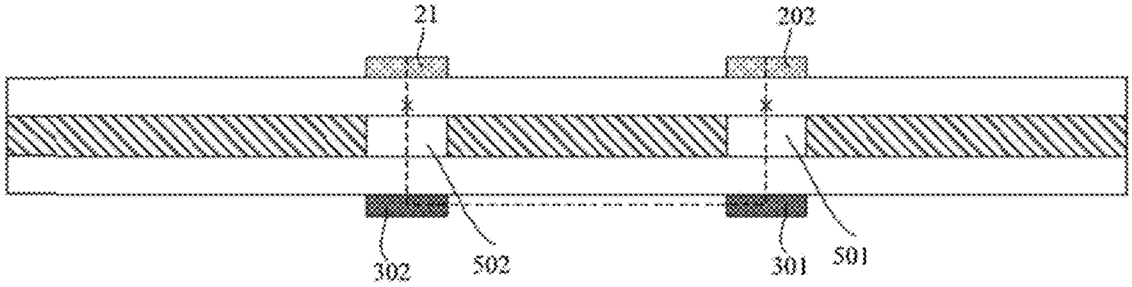
FIG. 6 is a schematic diagram illustrating a signal coupling in the antenna shown in FIG. 1.

Further, with continued reference to FIG. 4, the first feed structure 200 has a first feed port 201 and at least one second feed port 202; each second feed structure 20 has a third feed port 21 and at least one fourth feed port 22. FIG. 5 is a top view of a reference electrode layer 50 of the antenna shown in FIG. 1. As shown in FIG. 5, the reference electrode layer 50 has a plurality of first openings 501 and a plurality of second openings 502 therein. For each sub-array 100, a fourth feed port 22 of the second feed structure 20 is connected to a corresponding first radiation portion 10, and orthographic projections of any two of one first opening 501 in the reference electrode layer 50, the first transmission structure 301 of a corresponding phase shifter 30, a corresponding second feed port 202 of the first feed structure 200 on the first dielectric substrate 101 overlap with each other; orthographic projections of any two of one second opening 502 in the reference electrode layer 50, the second transmission structure 302 of a corresponding phase shifter 30, and the third feed port 21 of the second feed structure 20 on the first dielectric substrate 101 overlap with each other. FIG. 6 is a schematic diagram illustrating a signal coupling in the antenna shown in FIG. 1. As shown in FIG. 6, that is, for each sub-array 100, the first transmission structure 301 of the phase shifter 30 is coupled to a corresponding second feed port 202 of the first feed structure 200 through a corresponding first opening 501 in the reference electrode layer 50. The second transmission structure 302 of the phase shifter 30 is coupled to the third feed port 21 of the second feed structure 20 through a corresponding second opening 502 in the reference electrode layer 50.

The antenna in the embodiment of the present disclosure may be a receiving antenna for receiving a microwave signal, may also be a transmitting antenna for transmitting a microwave signal, and may also be a transceiving antenna for simultaneously receiving and transmitting a microwave signal. The operation of one sub-array 100 in the antenna will be described as an example. When the antenna transmits microwave signals, the first feed port 201 of the first feed structure 200 feeds the microwave signals, and the microwave signals are coupled to the first transmission structure 301 of the at least one phase shifter 30 through the at least one second feed port 202 via the at least one first opening 501, and then are phase-shifted by the phase shifting portion 303 of the at least one phase shifter 30, and the phase-shifted microwave signals are fed out through the second transmission structure 302 of the at least one phase shifter 30 and coupled to the third feed port 21 of the at least one second feed structure 20 through the at least one second opening 502. In this case, the at least one fourth feed structure of the at least one second feed structure 20 is connected to the corresponding first radiation portion 10, and the microwave signals can be transmitted through the corresponding first radiation portion 10. When the antenna receives microwave signals, the at least one first radiation portion 10 receives the microwave signals and feeds the microwave signals into a corresponding fourth feed port 22 of a corresponding second feed structure 20, and then the microwave signals are coupled to the second transmission structure 302 of the at least one phase shifter 30 through a corresponding second opening 502 via the third feed port 21 of the corresponding second feed structure 20, the second transmission structure 302 feeds the microwave signals into the phase shifting portion 303 and the microwave signals are fed out by the first transmission structure 301, the first transmission structure 301 feeds the microwave signals into a corresponding second feed port 202 of the first feed structure 200 through a corresponding first opening 501, and finally the microwave signals are transmitted to the first feed port 201 of the first feed structure 200, thereby realizing the receiving of the microwave signals.

In some examples, with continued reference to FIG. 4, the number of first radiation portions 10 in the at least one sub-array 100 of the antenna may be N, where N≥2, and N is an integer. Accordingly, the number of fourth feed ports 22 of the second feed structure 20 in the at least one sub-array 100 is also N. For example: each second feed structure 20 may be a one-to-N power divider. In the embodiment of the present disclosure, taking N=3 as an example, accordingly, the number of the first radiation portions 10 in each sub-array 100 of the antenna is 3, each second feed structure 20 employs a one-to-three power divider, and the number of the fourth feed ports 22 of each second feed structure 20 is 3.

Figure 7:
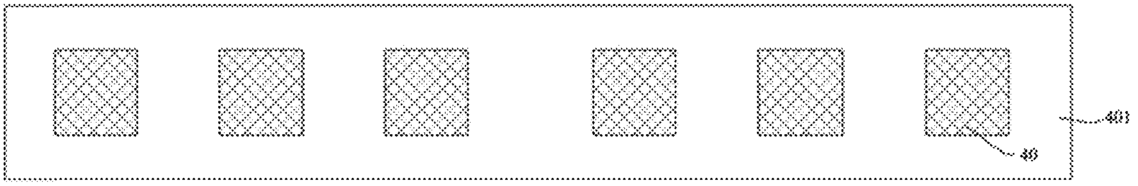
FIG. 7 is a top view of a second dielectric substrate and a second radiation portion of the antenna shown in FIG. 1.
Figure 8:
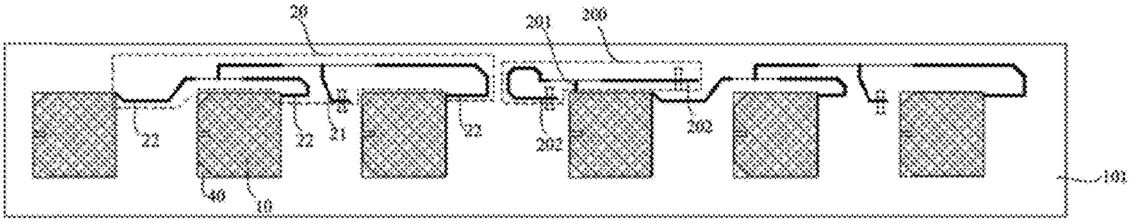
FIG. 8 is a top view of stacked layers shown in FIGS. 4 and 7.

In some examples, FIG. 7 is a top view of a second dielectric substrate and a second radiation portion of the antenna shown in FIG. 1. FIG. 8 is a top view of stacked layers shown in FIGS. 4 and 7. As shown in FIGS. 7 and 8, in addition to the above structure, each sub-array 100 of the antenna further includes a second dielectric substrate 401 disposed opposite to the first dielectric substrate 101, and at least one second radiation portion 40 disposed on the second dielectric substrate 401. An orthographic projection of one first radiation portion 10 and a corresponding second radiation portion 40 on the first dielectric substrate 101 at least partially overlaps with each other. For example: the first radiation portions 10 and the second radiation portions 40 in each sub-array 100 are arranged in a one-to-one correspondence. When the antenna of the embodiment of the present disclosure transmits a signal, a radio frequency signal radiated from each first radiation portion 10 may be transmitted through a corresponding second radiation portion 40. When the antenna receives a signal, after receiving a radio frequency signal, any one second radiation portions 40 feeds the radio frequency signal to a corresponding first radiation portion 10, which transmits the radio frequency signal to the at least one phase shifter 30 through a corresponding second feed structure 20 electrically connected to the first radiation portion 10, and the radio frequency signal is phase-shifted and then transmitted to the first feed structure 200, thereby realizing the receiving of the radio frequency signal. The radio frequency signal is radiated in cooperation with the first radiation portion 10 and the second radiation portion 40 corresponding to each other, so that compared with an antenna with only one first radiation portion 10, the radiation efficiency is effectively improved, a gain fluctuation in a frequency band is reduced, the gain of matched loss is obviously improved, and an impedance in the frequency band is smoothed.

Further, the at least one second radiation portion 40 is disposed on a side of the second dielectric substrate 401 away from the first dielectric substrate 101. In some examples, the second dielectric substrate 401 is used to provide support for the at least one second radiation portion 40. A material of the second dielectric substrate 401 includes, but is not limited to, polycarbonate (PC), copolymers of cycloolefin (COP) or polymethyl methacrylate (PMMA).

In some examples, the antenna in the embodiments of the present disclosure is a dual polarized antenna, each sub-array 100 includes two second feed structures 20; the fourth feed ports 22 of the two second feed structures 20 connected to the same first radiation portion 10 have different feed directions. That is, for each first radiation portion 10, two second feed structures 20 are required to feed the first radiation portion 10, and connection nodes between the fourth feed ports 22 of the two second feed structures 20 connected to the same first radiation portion 10 and the first radiation portion 10 are a first node and a second node, where an extension line of a line connecting the first node and a center of the first radiation portion 10 intersects with an extension line of a line connecting the second node and the center of the first radiation portion 10. For example: the extension line of the line connecting the first node and the center of the first radiation portion 10 and the extension line of the line connecting the second node and the center of the first radiation portion 10 are perpendicular to each other, so that a polarization direction of 0°/90° or ±45° is realized.

Figure 9:
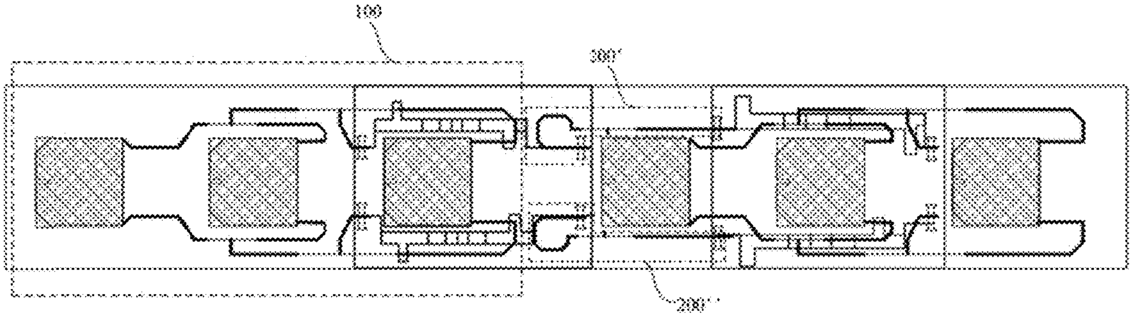
FIG. 9 is a top view of another antenna according to an embodiment of the present disclosure.
Figure 10:
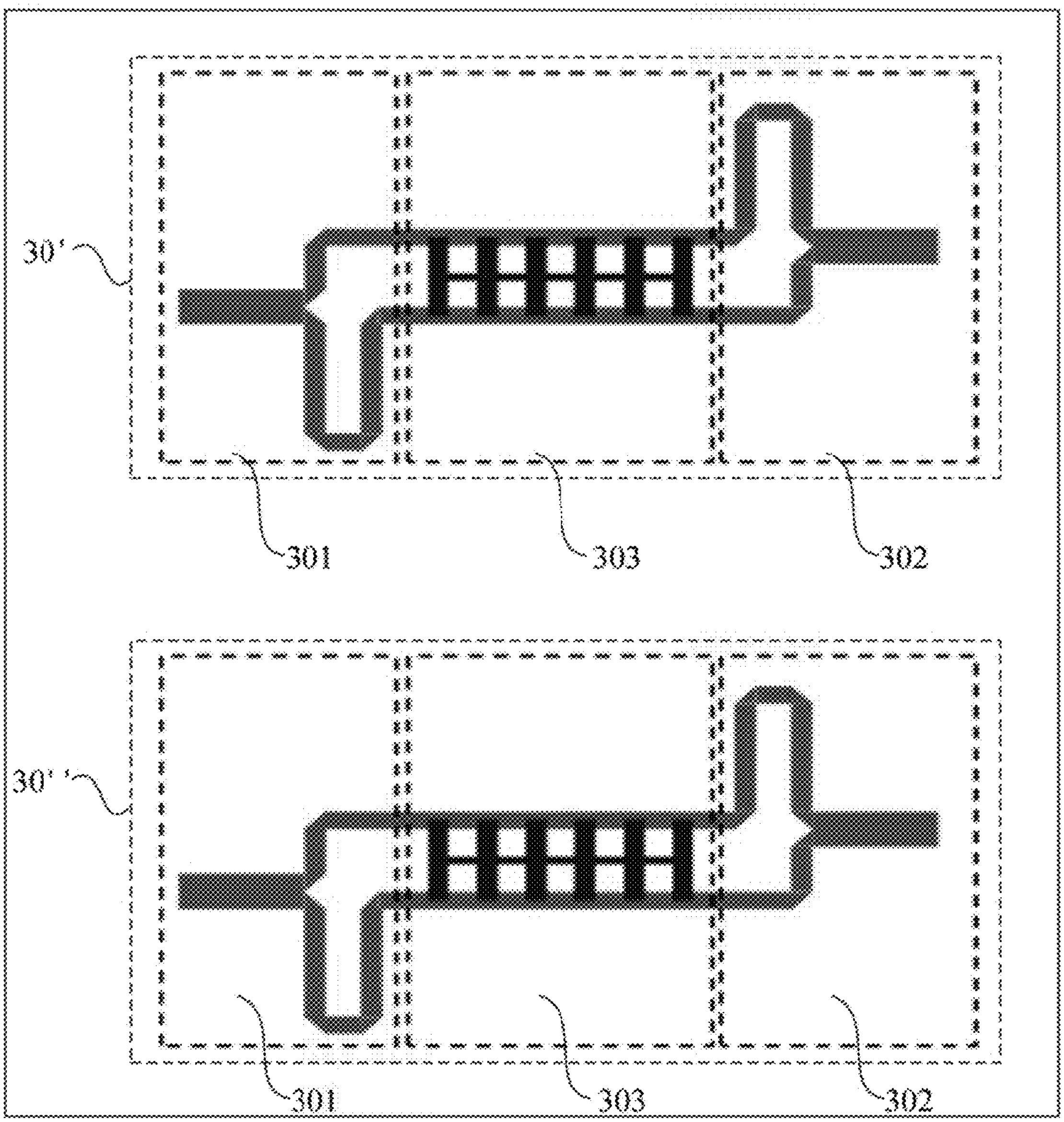
FIG. 10 is a top view of a phase shifter of the antenna shown in FIG. 9.
Figure 11:
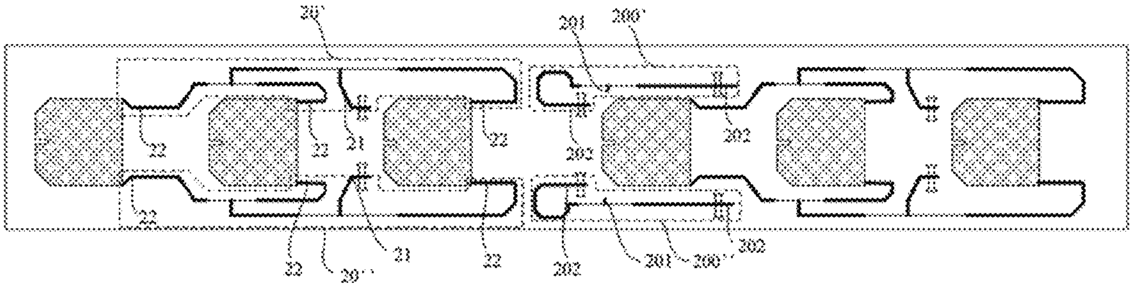
FIG. 11 is a top view of a first dielectric substrate, a first radiation portion, a first feed structure, and a second feed structure of the antenna shown in FIG. 9.
Figure 12:
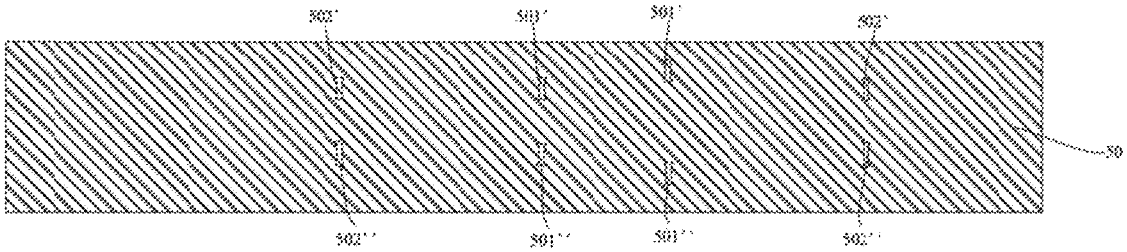
FIG. 12 is a top view of a reference electrode layer of the antenna shown in FIG. 9.
Figure 13:
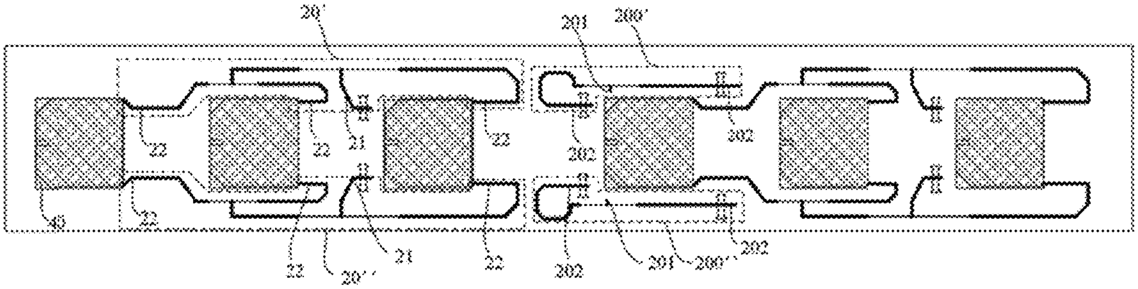
FIG. 13 is a top view of stacked layers shown in FIGS. 11 and 7.

Specifically, FIG. 9 is a top view of another antenna according to an embodiment of the present disclosure. FIG. 10 is a top view of a phase shifter 30 of the antenna shown in FIG. 9. FIG. 11 is a top view of a first dielectric substrate 101, a first radiation portion 10, a first feed structure 200, and a second feed structure 20 of the antenna shown in FIG. 9. FIG. 12 is a top view of a reference electrode layer 50 of the antenna shown in FIG. 9. FIG. 13 is a top view of stacking layers shown in FIGS. 11 and 7. As shown in FIGS. 9 to 13, when the antenna of the embodiment of the present disclosure is a dual polarized antenna, each sub-array 100 includes two second feed structures 20 and two phase shifters 30, the first transmission structures 301 of the two phase shifters 30 in each sub-array 100 may be fed by the second feed ports 202 of the two first feed structures 200. By taking any one sub-array 100 as an example, for convenience of description, the two second feed structures 20 included in the sub-array 100 are referred to as a second feed structure a20' and a second feed structure b20", respectively, and the two phase shifters 30 are referred to as a phase shifter a30' and a phase shifter b30", respectively. The two first openings 501 in the reference electrode layer 50 corresponding to the sub-array 100 are respectively referred to as a first opening a501' and a first opening b501", and the corresponding two second openings 502 are respectively referred to as a second opening a502' and a second opening b502". The second feed port 202 of the first feed structure a200' is coupled to the first transmission structure 301 of the phase shifter a30' through the first openings a501'; the second transmission structure 302 of the phase shifter a30' is coupled to the third feed port 21 of the second feed structure a20' through the second aperture a502; the three fourth feed ports 22 of the second feed structure a20' are connected to the three first radiation portions 10, respectively. Similarly, the second feed port 202 of the first feed structure b200" is coupled to the first transmission structure 301 of the phase shifter b30" through the first openings b501"; the second transmission structure 302 of the phase shifter b30" is coupled to the third feed port 21 of the second feed structure b20" through the second opening b502"; the three fourth feed ports 22 of the second feed structure b20" are connected to the three first radiation portions 10, respectively.

In some examples, each first feed structure 200 employs a one-to-two power divider, and the antenna includes a plurality of sub-arrays 100; every two sub-arrays 100 along the first direction form a group, and the two second feed ports 202 of the one-to-two power divider are respectively coupled to the first transmission structures 301 of the two phase shifters 30 in one group of sub-arrays 100 through the first openings 501. The one-to-two power divider is adopted as the first feed structure 200, for achieving the high integration of the antenna of the embodiment of the present disclosure.

In one example, each first feed structure 200 employs a one-to-two power divider, and the antenna includes a plurality of sub-arrays 100; every two sub-arrays 100 along the first direction form a group, and each sub-array 100 includes three first radiation portions 10. The antenna is a dual polarized antenna, i.e. two second feed structures 20 and two phase shifters 30 in each sub-array 100 are fed by two first feed structures 200 in the sub-array 100. The two sub-arrays 100 in each group of sub-arrays 100 are referred to as a first sub-array and a second sub-array, respectively. For each group of sub-arrays 100, one second feed port 202 of the first feed structure a200' is coupled to the first transmission structure 301 of the phase shifter a30' in the first sub-array through one first opening a501' corresponding to the first sub-array, and the other second feed port 202 of the first feed structure a200' is coupled to the first transmission structure 301 of the phase shifter a30' in the second sub-array through one first opening a501' corresponding to the second sub-array. In the first sub-array, the second transmission structure 302 of the phase shifter a30' is coupled to the third feed port 21 of the second feed structure a20' through the second opening 502*a*, and the three fourth feed ports 22 of the second feed structure a20' are electrically connected to the three first radiation portions 10; the second transmission structure 302 of the phase shifter b30" is coupled to the third feed port 21 of the second feed structure b20" through the second opening 502*b*, and the three fourth feed ports 22 of the second feed structure b20" are electrically connected to the three first radiation portions 10. In the second sub-array, the second transmission structure 302 of the phase shifter a30' is coupled to the third feed port 21 of the second feed structure a20' through the second opening 502*a*, and the three fourth feed ports 22 of the second feed structure a20' are electrically connected to the three first radiation portions 10; the second transmission structure 302 of the phase shifter b30" is coupled to the third feed port 21 of the second feed structure b20" through the second opening 502*b*, and the three fourth feed ports 22 of the second feed structure b20" are electrically connected to the three first radiation portions 10.

Figure 14:
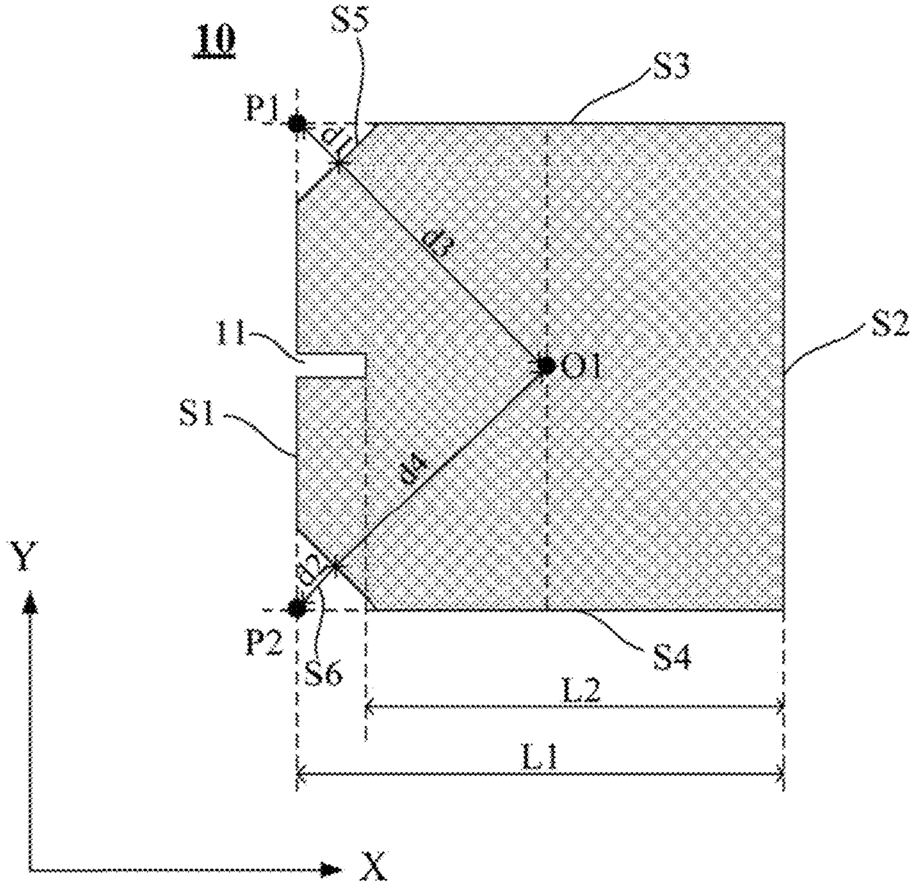
FIG. 14 is a top view of a first radiation portion according to an embodiment of the present disclosure.

In some examples, FIG. 14 is a top view of the first radiation portion 10 according to an embodiment of the present disclosure. As shown in FIG. 14, no matter which of the above structures is adopted by the antenna in the embodiment of the present disclosure, an outline of each first radiation portion 10 may include a first side S1 and a second side S2 that are oppositely disposed in the first direction X, and a third side S3 and a fourth side S4 that are oppositely disposed in the second direction Y; a main body portion of each of the first side S1 and the second side S2 extends along the second direction Y, and a main body portion of each of the third side S3 and the fourth side S4 extends along the first direction X. The second side S2 is directly connected to the third side S3 and the fourth side S4; two fourth feed ports 22 connected to the same first radiation portion 10 are connected to both ends of the second side S2, respectively. That is, for each first radiation portion 10, connection nodes of the fourth ports of the two second feed structures 20 and the first radiation portion 10 are located on two corners of the first radiation portion 10, thereby realizing a dual polarized antenna, for example, realizing a polarization of ±45°.

Further, the outline of each first radiation portion 10 includes not only the first side S1, the second side S2, the third side S3 and the fourth side S4 described above, but also a fifth side S5 connecting the first side S1 and the third side S3, and a sixth side S6 connecting the first side S1 and the fourth side S4. An extending direction of the first side S1 is the second direction Y, and the extending directions of the third side S3 and the fourth side S4 are the first direction X, that is, the extending direction of the first side S1 is different from the extending directions of the third side S3 and the fourth side S4, so that the fifth side S5 is connected to the first side S1 and the third side S3, which is equivalent to forming a flat chamfer between the first side S1 and the third side S3, and the sixth side S6 is connected to the first side S1 and the fourth side S4, which is equivalent to forming a flat chamfer between the first side S1 and the fourth side S4. Sizes of the two flat chamfers depend on lengths of the fifth side S5 and the sixth side S6, respectively, where the sizes of the two flat chamfers are used for impedance matching to reduce the microwave loss. In one example, the lengths of the fifth side S5 and the sixth side S6 may be equal to each other.

In some examples, for the outline of each first radiation portion 10, an intersection point of an extension line of the first side S1 and an extension line of the third side S3 is a first intersection point P1, and an intersection point of the extension line of the first side S1 and an extension line of the fourth side S4 is a second intersection point P2. A midpoint of a line connecting a midpoint of the third side S3 and a midpoint of the fourth side S4 is a first midpoint O1. The shortest distance from the first intersection point P1 to the fifth side S5 is a first distance d1, the shortest distance from the second intersection point to the sixth side S6 is a second distance d2, a distance from the first intersection point P1 to the first midpoint O1 is a third distance d3, and a distance from the second intersection point P2 to the first midpoint O1 is a fourth distance d4. Each of a ratio of the first distance d1 to the third distance d3 and a ratio of the second distance d2 to the fourth distance d4 may be in a range from 2:15 to 3:14. For example: d1:d3=2.2627:14.823. In one example, the ratio of the first distance d1 to the third distance d3 and the ratio of the second distance d2 to the fourth distance d4 may be equal to each other, so that the lengths of the fifth side S5 and the sixth side S6 may be equal to each other.

Further, the outline of each first radiation portion 10 includes the first side S1, the second side S2, the third side S3 and the fourth side S4, or includes the first side S1, the second side S2, the third side S3, the fourth side S4, the fifth side S5 and the sixth side S6, a recess portion (a groove portion) 11 is provided on the first side S1 and is recessed toward the second side S2. The recess portion 11 is provided to improve the isolation of the radio frequency signals fed into the same first radiation portion 10 by the two second feed structures 20. The recess portion 11 includes, but is not limited to, a rectangular slot.

In one example, for the outline of each first radiation portion 10, there is an angle between the first direction X and an extending direction of a line connecting a center of the recess portion on the first side S1 and the midpoint of the second side S2 and in a range from 0° to 5°. For example: the angle between the first direction X and the extending direction of the line connecting the center of the recess portion on the first side S1 and the midpoint of the second side S2 is 0°, that is, the extending direction of the line connecting the center of the recess portion on the first side S1 and the midpoint of the second side S2 is the first direction X.

In one example, for the outline of each first radiation portion 10, a ratio of the maximum distance L1 to the minimum distance L2 from the first side S1 to the second side S2 in the first direction X is in a range from 25:19 to 22:19; for example: L1:L2=23.9:21.8. That is, a ratio of the maximum distance from the first side S1 to the second side S2 in the first direction X to a distance from the bottom of the recess portion to the second side S2 is in a range from 25:19 to 22:19. It can be seen that by setting a depth of the recess portion, an optimal isolation of the radio frequency signals fed into the same first radiation portion 10 by the two second feed structures 20 can be obtained.

In some examples, further, the outline of each first radiation portion 10 includes the first side S1, the second side S2, the third side S3 and the fourth side S4, or includes the first side S1, the second side S2, the third side S3, the fourth side S4, the fifth side S5 and the sixth side S6, the two second feed structures 20 in each sub-array 100 are symmetrically arranged with respect to a straight line extending in the first direction X and passing through a midpoint of the second side S2 of the outline of the first radiation portion 10 as a symmetry axis. For example: one second feed structure 20 in each sub-array 100 is located on a side close to the third side (the upper side of the first radiation portion 10), and the other second feed structure is located on a side close to the fourth side (the lower side of the first radiation portion 10).

Figure 15:
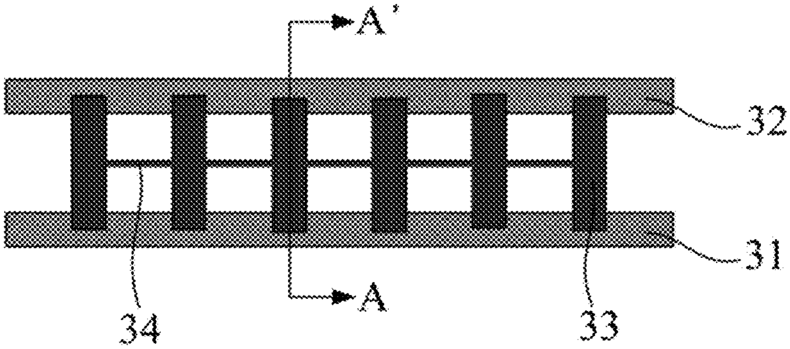
FIG. 15 is a top view of a phase shift portion in a phase shifter according to an embodiment of the present disclosure.
Figure 16:
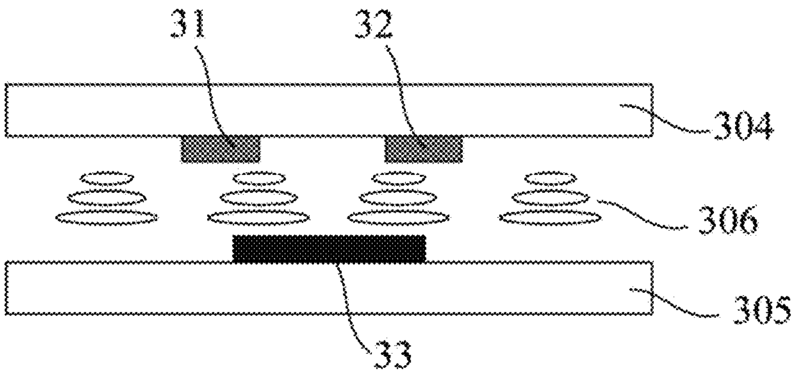
FIG. 16 is a cross-sectional view taken along a line A-A' of FIG. 15.

In some examples, FIG. 15 is a top view of a phase shift portion 303 in a phase shifter 30 according to an embodiment of the present disclosure. FIG. 16 is a cross-sectional view taken along a line A-A' of FIG. 15. As shown in FIGS. 15 and 16, no matter which of the above structures is adopted by the antenna in the embodiment of the present disclosure, each phase shifter 30 in the antenna may adopt a liquid crystal phase shifter 30, and a phase shifting portion 303 of the liquid crystal phase shifter 30 may include a third dielectric substrate 304 and a fourth dielectric substrate 305 that are oppositely disposed, a first electrode layer disposed on a side of the third dielectric substrate 304 close to the fourth dielectric substrate 305, a second electrode layer disposed on a side of the fourth dielectric substrate 305 close to the third dielectric substrate 304, and a liquid crystal layer 306 disposed between the first electrode layer and the second electrode layer. The third dielectric substrate 304 is closer to the reference electrode layer 50 than the fourth dielectric substrate 305, that is, in the antenna, the reference electrode layer 50 is disposed between the third dielectric substrate 304 and the first dielectric substrate 101, so that the first electrode layer, the second electrode layer and the reference electrode layer 50 can form a current loop. In this way, a voltage is applied to the first electrode layer and the second electrode layer to form an electric field therebetween to drive the liquid crystal molecules to rotate, thereby changing the dielectric constant of the liquid crystal layer 306, and thus, realizing the phase shift of the microwave. In the antenna of the embodiment of the present disclosure, the phase shifting portion 303 may employ a differential mode two-line phase shifter 30 in any form. The phase shifting portion 303 in the embodiment of the present disclosure is explained below with reference to specific examples.

For example: the first electrode layer in the phase shifting portion 303 includes a first main line 31 and a second main line 32, and the second electrode layer includes a plurality of patch electrodes 33 separated from each other. Extending directions of the first main line 31 and the second main line 32 are the same; the plurality of patch electrodes 33 separated from each other are arranged side by side along the extending direction of the first main line 31, and orthographic projections of opposite ends of each patch electrode 33 along an extending direction of the patch electrode 33 on the first dielectric substrate 101 overlap with orthographic projections of the first main line 31 and the second main line 32 on the third dielectric substrate 304, respectively. In this case, an overlapping region of the first main line 31 and each patch electrode and an overlapping region of the second main line 32 and each patch electrode form a capacitor region, respectively. By applying different voltages to the first main line 31, the second main line 32, and each patch electrode 33, an electric field is formed in the overlapping region of the first main line 31 and the patch electrode 33, and an electric field is also formed in the overlapping region of the second main line 32 and the patch electrode 33, which changes the dielectric constant of liquid crystal molecules in the overlapping region of the first main line 31 and the patch electrode 33 and the overlapping region of the second main line 32 and the patch electrode 33, thereby achieving a phase shift of the microwave signal. For the phase shifting portion 303, both ends of the first main line 31 and both ends of the second main line 32 are connected to the first transmission structure 301 and the second transmission structure 302, respectively.

It should be noted that in fact, the operation of the phase shifting portion 303 is not dependent on the reference electrode layer 50, but when the phase shifting portion 303 is integrated in the antenna, one or more reference electrode layers 50 are necessarily provided. Alternatively, if the reference electrode layer 50 is integrated in the antenna, the reference electrode layer 50 of the phase shifting portion 303 may be shared with the reference electrode layer 50 in the antenna. The reference electrode layer 50 may be disposed on a side of the third dielectric substrate 304 away from the liquid crystal layer 306, or may be disposed on a side of the fourth dielectric substrate 305 away from the liquid crystal layer 306. In addition, the reference electrode layer 50 includes, but is not limited to, a ground layer, as long as the reference electrode layer 50 forms a current loop with the first main line 31 and the patch electrodes, and forms a current loop with the second main line 32 and the patch electrodes 33.

In some examples, the patch electrodes in the phase shifting portion 303 may be electrically connected together through a connection electrode. In this case, when the phase shifting portion 303 is in operation, the same bias voltage may be applied to the patch electrodes, which is easy to control. An orthographic projection of the connection electrode on the third dielectric substrate 304 does not overlap with the orthographic projection of the first main line 31 and the second main line 32 on the first dielectric substrate 101.

In some examples, the patch electrodes in the phase shift portion 303 are arranged periodically. For example, a distance between any two adjacent patch electrodes is constant. In some examples, areas of the overlapping regions of the orthographic projections of the patch electrodes and the first main line 31 on the third dielectric substrate 304 are equal to each other; and/or areas of the overlapping regions of the orthographic projections of the patch electrodes and the second main line 32 on the third dielectric substrate 304 are equal to each other. In this way, the phase shifting portion 303 is easy to control. Further, a width of each patch electrode may be constant, and a length of each patch electrode may also be constant.

In some examples, the first main line 31 and the second main line 32 in the phase shifting portion 303 may each employ a transmission line, which is straight line segment. The extending directions of the first main line 31 and the second main line 32 may be parallel to each other, which can help to realize the miniaturization of the phase shifting portion 303 and the high integration of the antenna. Alternatively, the first and second main lines 31 and 32 may also be curved, and a shape of each of the first and second main lines 31 and 32 is not limited in the embodiment of the present disclosure.

In some examples, the first and second transmission structures 301 and 302 in the phase shifter 30 may be disposed on the third dielectric substrate 304. In this case, the first and second transmission structures 301 and 302 and the first and second main lines 31 and 32 are disposed in the same layer and made of the same material.

In some examples, each of the first main line 31 and the second main line 32 in the phase shifting portion 303 of the phase shifter 30 includes first and second ends that are disposed oppositely; the first transmission structure 301 includes a first combining line, a first branch line, and a second branch line, the second transmission structure 302 includes a second combining line, a third branch line, and a fourth branch line; orthographic projections of the first combining line and the corresponding first opening 501 on the first dielectric substrate 101 overlap with each other; one end of the first branch line is connected to a first end of the first main line 31, and the other end of the first branch line is connected to the first combining line; one end of the second branch line is connected to a first end of the second main line 32, and the other end of the second branch line is connected to the first combining line; orthographic projections of the second combining line and the corresponding second opening 502 on the first dielectric substrate 101 overlap with each other; one end of the third branch line is connected to a second end of the first main line 31, and the other end of the third branch line is connected to the second combining line; one end of the fourth branch line is connected to a second end of the second main line 32, and the other end of the fourth branch line is connected to the second combining line; line lengths of the first branch line and the fourth branch line are the same; line lengths of the second branch line and the third branch line are the same, and the line length of the first branch line is greater than that of the second branch line. As an example, the antenna is a transmitting antenna, when a radio frequency signal fed in from one second feed port 202 of one first feed structure 200 is coupled to the first combining line of the first transmission structure 301 through a corresponding first opening 501, the first combining line divides the radio frequency signal into two paths of signals which are fed into the first main line 31 and the second main line 32 through the first branch line and the second branch line, respectively; where the line lengths of the first branch line and the second branch line are different from each other, so that the two paths of signals obtained by dividing the fed radio frequency signal has a certain phase difference therebetween; and then the two paths of radio frequency signals are transmitted to the third branch line and the fourth branch line through the first main line 31 and the second main line 32; where the line lengths of the first branch line and the fourth branch line are the same as each other and the line lengths of the second branch line and the third branch line are the same as each other, so that the two paths of radio frequency signals are restored, and thus, the radio frequency signal output by the second combining line and the radio frequency signal fed by the first combining line have a same amplitude and a same phase; and finally, the second combining line feeds the radio frequency signal into the second feed network through the corresponding second opening 502 and radiates the radio frequency signal through the first radiation portion 10.

Further, the first transmission structure 301 and the second transmission structure 302 in the phase shifter 30 may adopt a BALUN structure. It should be noted that the BALUN structure is a three-port device that can be applied in a microwave radio frequency device, and is a radio frequency transmission line transformer that converts a matching input into a differential input, and can be used for exciting a differential line, an amplifier, a wideband antenna, a balanced mixer, a balanced frequency multiplier and a modulator, the phase shifter 30, and any circuit design that requires a transmission for signals with a same amplitude and a phase difference of 180° on two lines. Two outputs of the BALUN component have a same amplitude and opposite phases. In the frequency domain, this means that there is a phase difference of 180° between the two outputs; in the time domain, this means that a voltage of one balanced output is a negative value of the other balanced output.

For example: with continued reference to FIG. 16, the third dielectric substrate 304 has oppositely disposed first and second surfaces, and the reference electrode layer 50 is disposed on the first surface of the third dielectric substrate 304. The first transmission structure 301 and the second transmission structure 302 both adopt BALUN components, and the phase shifting portion 303 adopts the phase shifting portion 303 shown in FIG. 3. The first transmission structure 301, the second transmission structure 302, the first main line 31, and the second main line 32 are all disposed on the second surface of the third dielectric substrate 304. The first branch line and the second branch line of the first transmission structure 301 are directly connected to the first combining line. For example, the first combining line, the first branch line and the second branch line of the first transmission structure 301 have a one-piece structure. In the first transmission structure 301, the first branch line includes a meandering line so that the first branch line obtains a phase difference of 180° from the second branch line. The third branch line and the fourth branch line of the second transmission structure 302 are directly connected to the second combining line. For example, the second combining line, the third branch line and the fourth branch line of the second transmission structure 302 have a one-piece structure. In the second transmission structure 302, the fourth branch line includes a meandering line so that the fourth branch line obtains a phase difference of 180° From the third branch line. Moreover, the first main line 31, the first branch line and the third branch line have a one-piece structure; the second main line 32, the second branch line and the fourth branch line have a one-piece structure. In this case, the first branch line is provided with a winding line of a half wavelength of the signal so that the first branch line obtains a phase difference of 180° from the second branch line. The microwave signal fed through the first branch line is fed into the third branch line through the first main line 31, and then is fed into the second combining line through the third branch line; the microwave signal fed through the second branch line is fed into the fourth branch line through the second main line 32, and then transmitted to the second combining line through the fourth branch line provided with a winding line of a half wavelength of the signal. At this time, the microwave signals transmitted through the third branch line and the fourth branch line and fed into the second combining line have the same amplitude and the same phase.

Further, no matter which of the above structures is adopted by the phase shifter 30 in the embodiment of the present disclosure, the third dielectric substrate 304 and the fourth dielectric substrate 305 may be a glass substrate, or a sapphire substrate, or may be a transparent and flexible substrate made of polyethylene terephthalate, triallyl cyanurate, or polyimide and with a thickness in a range from 10 μm to 500 μm. Specifically, the third dielectric substrate 304 and the fourth dielectric substrate 305 may be made of high-purity quartz glass with an extremely low dielectric loss. Instead of the common glass substrate, the third dielectric substrate 304 and the fourth dielectric substrate 305 are made of quartz glass, so that the loss of the microwave can be effectively reduced, and the phase shifter 30 has low power consumption and high signal-to-noise ratio.

Figure 17:
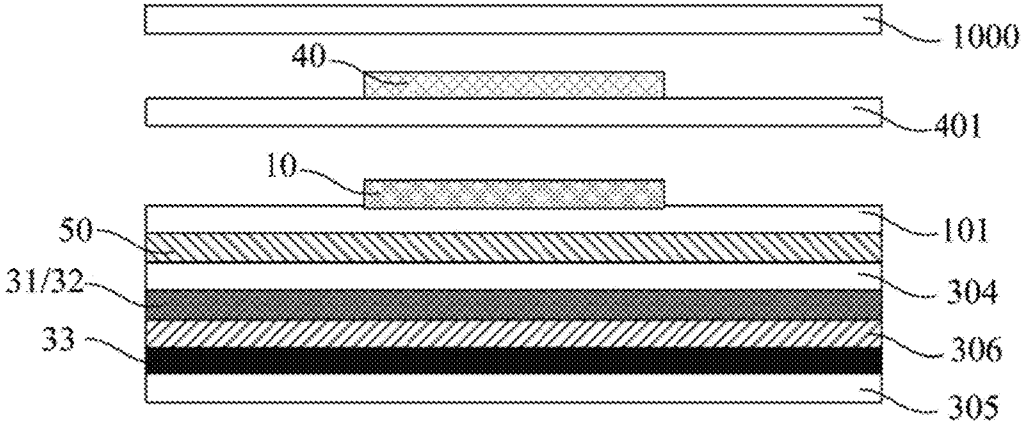
FIG. 17 is a cross-sectional view of another antenna according to an embodiment of the present disclosure.

In some examples, FIG. 17 is a cross-sectional view of another antenna according to an embodiment of the present disclosure. As shown in FIG. 17, in addition to the above structure, the antenna in the embodiment of the present disclosure may include a housing 1000; the at least one sub-array 100 and the first feed structure 200 are located in a hollow space of the housing 1000, and the housing 1000 is used to protect the antenna. Further, the housing 1000 may be made of plastic. For example: the plastic may be polycarbonate plastic or cycloolefin polymer plastic.

In some examples, no matter which of the above structures is adopted by the antenna in the embodiment of the present disclosure, the first dielectric substrate 101 includes, but is not limited to, a printed circuit board (PCB).

Figure 18:
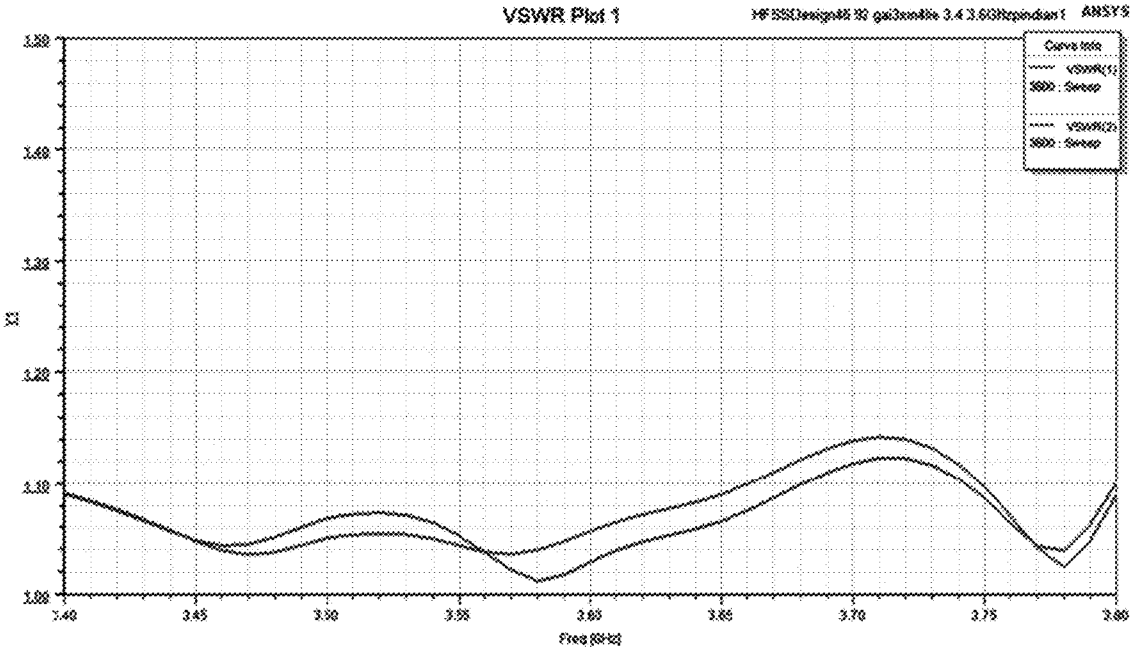
FIG. 18 is a characteristic pattern of a standing wave of the antenna shown in FIG. 13.
Figure 19:
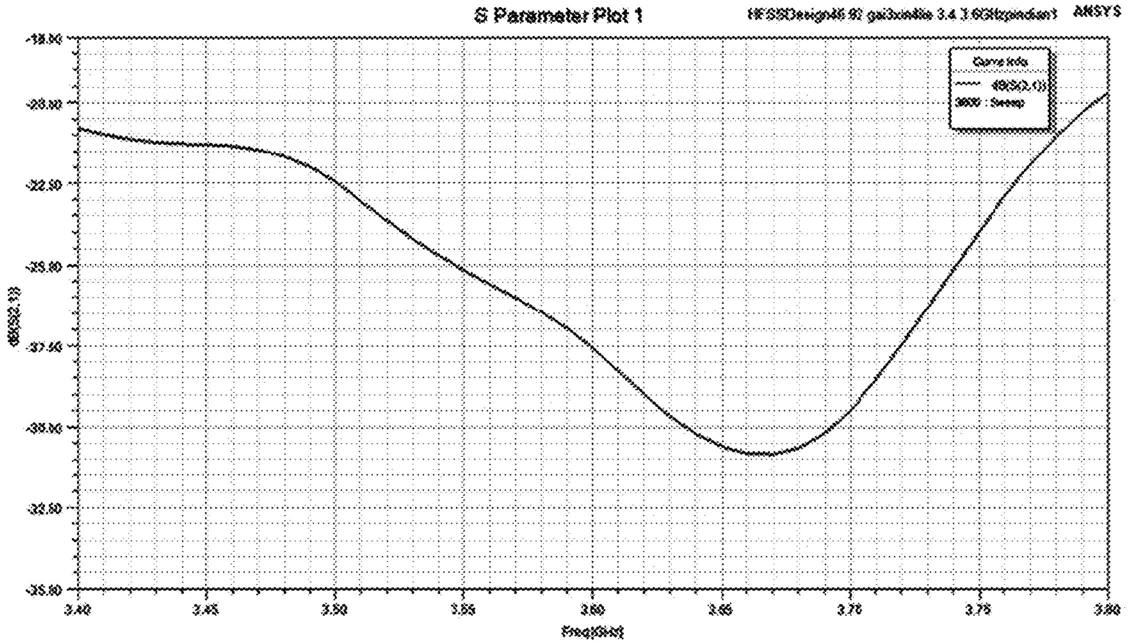
FIG. 19 is a characteristic pattern of an isolation of the antenna shown in FIG. 13.
Figure 20:
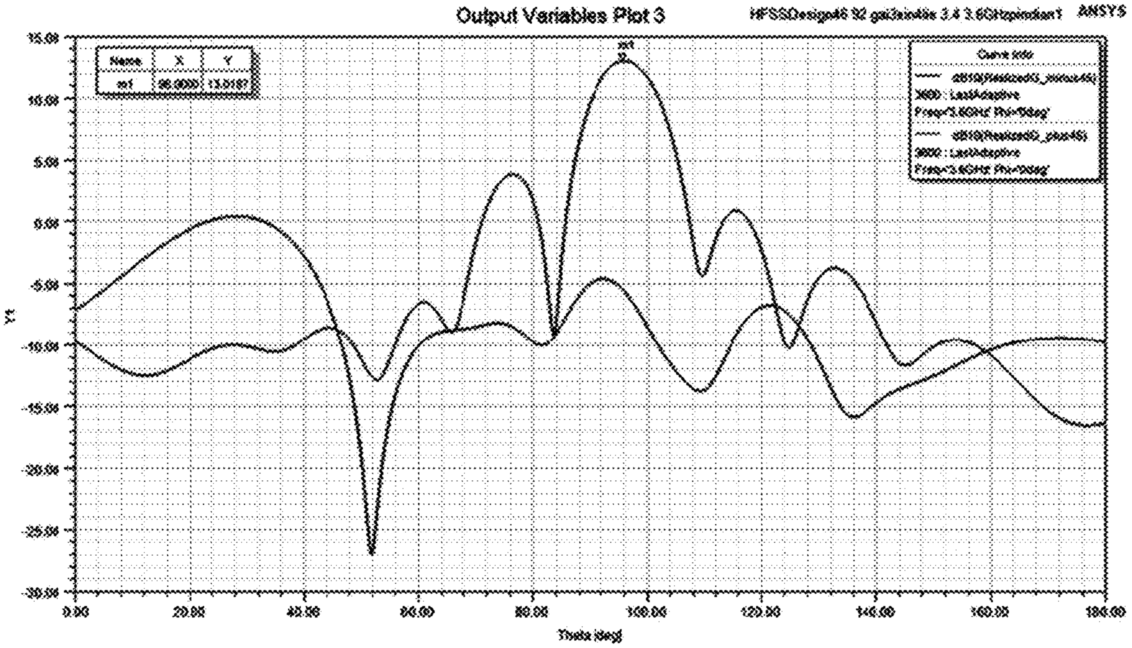
FIG. 20 is a radiation pattern of a horizontal plane and a vertical plane of a center frequency of an antenna according to an embodiment of the present disclosure.

In order to clearly understand the effect of the antenna of the embodiment of the present disclosure, a standing wave ratio, an isolation degree, a radiation gain, and a beam width of the antenna shown in FIG. 13 of the embodiment of the present disclosure are verified through simulation experiments. FIG. 18 is a characteristic pattern of a standing wave of the antenna shown in FIG. 13. As shown in FIG. 18, the antenna of the embodiment of the present disclosure has a voltage standing wave ratio (VSWR) lower than 1.2 at a frequency in a range from 3.40 GHz to 3.80 GHz. FIG. 19 is a characteristic pattern of an isolation of the antenna shown in FIG. 13. As shown in FIG. 19, the antenna according to the embodiment of the present disclosure may achieve an in-band isolation degree greater than 18.75 dB, which effectively improves the resistance to signal crosstalk. FIG. 20 is a radiation pattern of a horizontal plane and a vertical plane of a center frequency of an antenna according to an embodiment of the present disclosure. As shown in FIG. 20, the antenna of the embodiment of the present disclosure has a radiation gain higher than 13.0187 dBi at a center frequency; a beam width for the −45° polarization in a range from 86° to 106°; and an excellent signal coverage.

Figure 21:
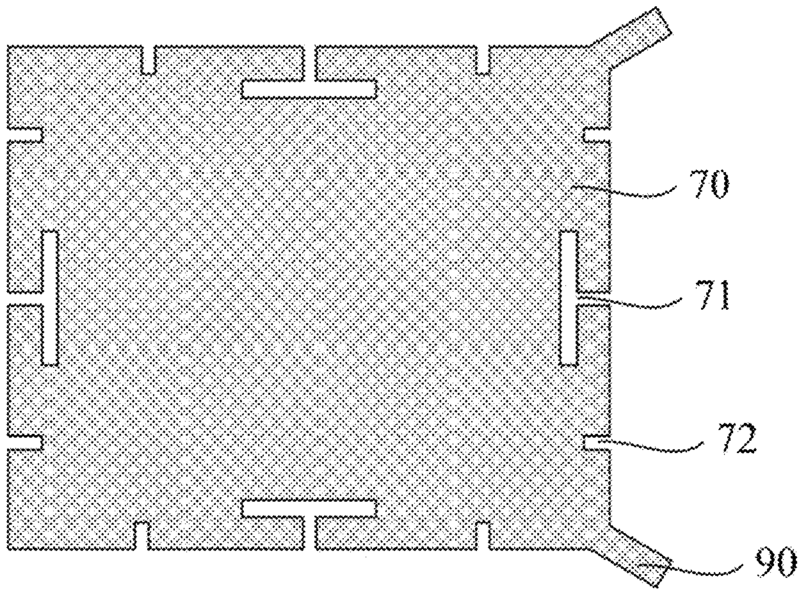
FIG. 21 is a top view of a first radiation portion and a first feed line of an antenna according to an embodiment of the present disclosure.

In some examples, FIG. 21 is a top view of a first radiation portion according to an embodiment of the present disclosure. As shown in FIG. 21, an outline of each first radiation portion 70 in the antenna of the embodiment of the present disclosure may include at least one first protrusion portion and/or at least one first groove portion. The at least one first protrusion portion and/or the at least one first groove portion are/is provided for each first radiation portion 70, so that the current path is lengthened, which is equivalent to increase of the physical size of the antenna, so that the resonant frequency of the antenna is reduced, and the miniaturization of the antenna is achieved. In addition, the antenna having such the structure has a characteristic of a low profile.

It should be noted that in the embodiment of the present disclosure, the at least one first groove portion is provided for each first radiation portion 70 as an example for description, which does not limit the protection scope of the embodiment of the present disclosure. For example: the outline of each first radiation portion 10 is provided with a plurality of first groove portions, a shape of each first groove portion includes a square, a rectangle, a triangle, a T-shape, an L-shape, or the like. Further, the outline of each first radiation portion 70 is provided with a plurality of first groove portions 71/72, and the shapes of at least some of the plurality of first groove portions 71/72 may be different from each other. Likewise, the outline of each first radiation portion 70 is provided with a plurality of protrusion portions, and the shapes of at least some of the plurality of protrusion portions may be different from each other.

Further, each first radiation portion 70 may be polygonal, circular, elliptical, etc. For example: the first radiation portion 70 is a polygon shape, which may include a first side and a second side that are oppositely disposed in the first direction, and a third side and a fourth side that are oppositely disposed in the second direction; a main body portion of each of the first side and the second side extends along the second direction, and a main body portion of each of the third side and the fourth side extends along the first direction. In one example, groove portions having two shapes are provided on each of the first, second, third, and fourth sides of each first radiation portion 10. For convenience of description, the first groove portions having two shapes are referred to as a first groove portion a71 and a first groove portion b72, respectively. Each first groove portion a71 is T-shaped, and a "—" part of the T-shaped groove portion is closer to the center of the first radiation portion 70 than a "|" part of the T-shaped groove portion. The first groove portion b72 has a rectangular shape. One first groove portion a71 and two first groove portions b72 are provided on each side of the first radiation portion 70, with the first groove portion a71 being located between the two first groove portions b72. Further, a point of the first groove portion a71 closest to a center of the first radiation portion 70 on the first side is a first point, a point of the first groove portion a71 closest to the center of the first radiation portion 70 on the second side is a second point, a point of the first groove portion a71 closest to the center of the first radiation portion 10 on the third side is a third point, and a point of the first groove portion a71 closest to the center of the first radiation portion 70 on the fourth side is a fourth point, the first point, the center, and the second point on the first radiation portion 70 are on a straight line, and the third point, the center, and the fourth point are on a straight line. It should be noted that FIG. 22 only illustrates one arrangement of the first groove portions 71/72 on the outline of each first radiation portion 70, which does not limit the protection scope of the embodiment of the present disclosure. In the embodiment of the present disclosure, the shapes and number of the first groove portions or the first protrusion portions of the outline of each first radiation portion 70 may be specifically defined according to the requirements of parameters (such as a size) of the antenna.

Figure 22:
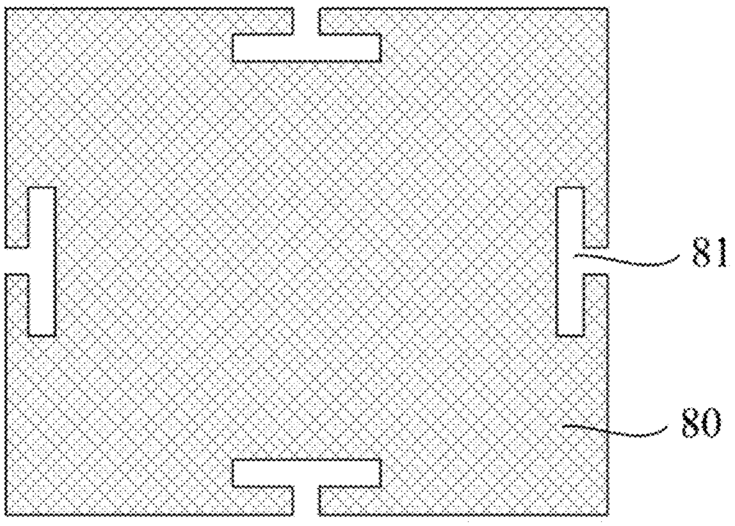
FIG. 22 is a top view of a second radiation portion of an antenna according to an embodiment of the present disclosure.

Further, FIG. 22 is a top view of a second radiation portion according to an embodiment of the present disclosure. As shown in FIG. 22, an outline of each second radiation portion 80 in the embodiment of the present disclosure may include at least one second protrusion portion and/or at least one first groove portion 81. When the first protrusion portions are provided on each first radiation portion 70, the second protrusion portions are provided on a corresponding second radiation portion 80, that is, the second protrusion portions are in a one-to-one correspondence with the first protrusion portions. When the first groove portions are provided on each first radiation portion 70, the second groove portions are provided on a corresponding second radiation portion 80, that is, the second groove portions 81 are in a one-to-one correspondence with the first groove portions 71. In this case, a current path on a surface of each second radiation portion 80 can be changed, so that the current flows in a bending path along the second protrusion portions or the second groove portions 81 of the outline of the second radiation portion 80. In this way, the current path is lengthened, which is equivalent to increase of the physical size of the antenna, so that the resonant frequency of the antenna is reduced, and the miniaturization of the antenna is achieved. In addition, the antenna having such the structure has a characteristic of a low profile.

Figure 23:
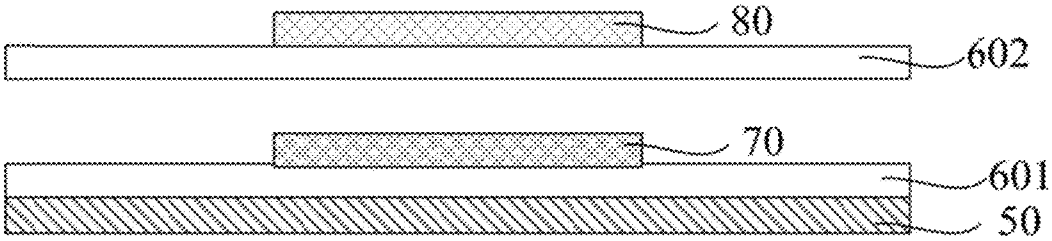
FIG. 23 is a top view of an antenna according to an embodiment of the present disclosure.

In a second aspect, FIG. 23 is a cross-sectional view of yet another antenna according to an embodiment of the present disclosure. As shown in FIGS. 21 and 22, the present disclosure provides an antenna, which includes a fifth dielectric substrate 601, at least one first radiation portion 70 and at least one feed line disposed on the fifth dielectric substrate, and a reference electrode layer 50 disposed on a side of the fifth dielectric substrate 601 away from the at least one first radiation portion 70. An orthographic projection of each of the at least one first radiation portion 70 and the at least one feed line on the third dielectric substrate 304 at least partially overlaps with an orthographic projection of the reference electrode layer 50 on the third dielectric substrate 304. Each first radiation portion 70 is electrically connected to at least one first feed line 90, and the first feed lines electrically connected to different first radiation portions 70 are different. That is, different first radiation portions 70 are fed by different first feed lines 70. In the embodiment of the present disclosure, the outline of each first radiation portion 70 is provided with first protrusion portions and/or first groove portions 71/72. Since the outline of each first radiation portion 70 is provided with the first protrusion portions and/or the first groove portions 71/72, a current path on a surface of each first radiation portion 70 can be changed, so that the current flows in a bending path along the first protrusion portions and/or the first groove portions 71/72 of the outline of each first radiation portion 70. In this way, the current path is lengthened, which is equivalent to increase of the physical size of the antenna, so that the resonant frequency of the antenna is reduced, and the miniaturization of the antenna is achieved. In addition, the antenna having such the structure has a characteristic of a low profile.

In some examples, the antenna in the embodiment of the present disclosure may be a dual polarized antenna. Each first radiation portion 70 is electrically connected to two feed lines, which are referred to as a first feed line 90 and a second feed line for convenience of description. For each first radiation portion 70, a connection node of the first feed line 90 and the first radiation portion 70 is a first node, and a connection node of the second feed line and the first radiation portion 70 is a second node. A line connecting the first node and a center of the first radiation portion 70 intersects with a line connecting the second node and the center of the first radiation portion 70. For example, the line connecting the first node and a center of the first radiation portion 70 is perpendicular to a line connecting the second node and the center of the first radiation portion 70. In one example, each first radiation portion 70 includes a first side and a second side that are oppositely disposed in the first direction, and a third side and a fourth side that are oppositely disposed in the second direction; a main body portion of each of the first side and the second side extends along the second direction, and a main body portion of each of the third side and the fourth side extends along the first direction. A connection node of the first side and the third side is a first vertex, a connection node of the first side and the fourth side is a second vertex, a connection node of the second side and the fourth side is a third vertex, and a connection node of the second side and the third side is a fourth vertex. For each first radiation portion 70, a connection node of the first radiation portion 70 and the first feed line 90 is the first vertex, and a connection node of the first radiation portion 70 and the second feed line is the second vertex. Alternatively, the connection node of the first radiation portion 70 and the first feed line 90 is the second vertex, and the connection node of the first radiation portion 70 and the second feed line is the third vertex. Alternatively, the connection node of the first radiation portion 70 and the first feed line 90 is the third vertex, and the connection node of the first radiation portion 70 and the second feed line is the fourth vertex. Alternatively, the connection node of the first radiation portion 70 and the first feed line 90 is the fourth vertex, and the connection node of the first radiation portion 70 and the second feed line is the first vertex. At this time, the radiation antenna can realize a polarization direction of 0°/90°.

In some examples, the antenna in the embodiment of the present disclosure may further include a sixth dielectric substrate 602 disposed opposite to the fifth dielectric substrate 601, and at least one second radiation portion 80 disposed on the sixth dielectric substrate 602, and orthographic projections of each second radiation portion 80 and a corresponding first radiation portion 70 on the fifth dielectric substrate 601 at least partially overlap with each other. For example: the at least one first radiation portion 70 and the at least one second radiation portion 80 are in a one-to-one correspondence with each other. When the antenna of the embodiment of the present disclosure transmits a signal, the radio frequency signal radiated from each first radiation portion 10 may be transmitted through a corresponding second radiation portion 80. When the antenna receives a signal, after receiving a radio frequency signal, any one of the second radiation portions 80 feeds the radio frequency signal to a corresponding first radiation portion 70, thereby completing the reception of the radio frequency signal. The radio frequency signal is radiated in cooperation with the first radiation portion 70 and the second radiation portion 80 corresponding to each other, so that compared with an antenna with only one first radiation portion 70, the radiation efficiency is effectively improved, a gain fluctuation in a frequency band is reduced, the gain of matched loss is obviously improved, and an impedance in the frequency band is smoothed.

In some examples, each second radiation portion in the embodiment of the present disclosure may adopt the structure shown in FIG. 22, that is, the outline of each second radiation portion 80 is also provided with at least one second protrusion portion and/or at least one second groove portion 81. In this case, a current path on a surface of each second radiation portion 80 can be changed, so that the current flows in a bending path along the second protrusion portions and/or the second groove portions of the outline of the second radiation portion 80. In this way, the current path is lengthened, which is equivalent to increase of the physical size of the antenna, so that the resonant frequency of the antenna is reduced, and the miniaturization of the antenna is achieved. In addition, the antenna having such the structure has a characteristic of a low profile.

In some examples, when the outline of each second radiation portion 80 is provided with the at least one second protrusion portion and/or the at least one second groove portion 81, the shapes and number of the at least one second protrusion portion and/or the at least one second groove portion 81 may be the same as or different from those of the first protrusion portions and/or the first groove portions on the outline of each first radiation portion 70. In the embodiment of the present disclosure, the shape of each second protrusion portion and/or each second groove portion 81 on the outline of each second radiation portion 80 may be selected to be the same as that of each first protrusion portion and/or each first groove portion on the outline of each first radiation portion 70, but is not limited in the embodiment of the present disclosure.

In one example, each first radiation portion 70 adopts the structure shown in FIG. 22, and the outline of each second radiation portion 80 may also include four sides, namely, a fifth side and a sixth side that are oppositely disposed in the first direction, and a seventh side and an eighth side that are oppositely disposed in the second direction; a main body portion of each of the fifth side and the sixth side extends along the second direction, and a main body portion of each of the seventh side and the eighth side extends along the first direction. T-shaped second groove portions are provided on four sides of the outline of each second radiation portion 80, and the T-shaped second groove portions provided on the fifth, sixth, seventh, and eighth sides are in a one-to-one correspondence with the T-shaped first groove portions provided on the first, second, third, and fourth sides of a corresponding first radiation portion 70, respectively. Further, an orthographic projection of the T-shaped first groove portion on the first side on the fifth dielectric substrate 601 is located and nested in an orthographic projection of the T-shaped second groove portion on the fifth side on the fifth dielectric substrate 601; an orthographic projection of the T-shaped first groove portion on the second side on the fifth dielectric substrate 601 is located and nested in an orthographic projection of the T-shaped second groove portion on the sixth side on the fifth dielectric substrate 601; an orthographic projection of the T-shaped first groove portion on the third side on the fifth dielectric substrate 601 is located and nested in an orthographic projection of the T-shaped second groove portion on the seventh side on the fifth dielectric substrate 601; an orthographic projection of the T-shaped first groove portion on the fourth side on the fifth dielectric substrate 601 is located and nested in an orthographic projection of the T-shaped second groove portion on the eighth side on the fifth dielectric substrate 601. It should be noted that this example is only one possible implementation of the antenna according to the embodiment of the present disclosure, and does not limit the protection scope of the embodiment of the present disclosure.

In some examples, the sixth dielectric substrate 602 is used to provide support for the at least one second radiation portion 80. A material of the sixth dielectric substrate 602 includes, but is not limited to, polycarbonate (PC), copolymers of cycloolefin (COP) or polymethyl methacrylate (PMMA). Alternatively, the sixth dielectric substrate 602 may be formed by filling foam for supporting the at least one second radiation portion 40.

In some examples, in addition to the above structure, the antenna in the embodiment of the present disclosure may include a housing; the fifth dielectric substrate 601 and the sixth dielectric substrate 602 may be located in a hollow space of the housing 1000, and the housing is used to protect the antenna. Further, the housing may be made of plastic. For example: the plastic may be polycarbonate plastic or cycloolefin polymer plastic.

In some examples, no matter which of the above structures is adopted by the antenna in the embodiment of the present disclosure, the fifth dielectric substrate 601 includes, but is not limited to, a printed circuit board (PCB).

Figure 24:
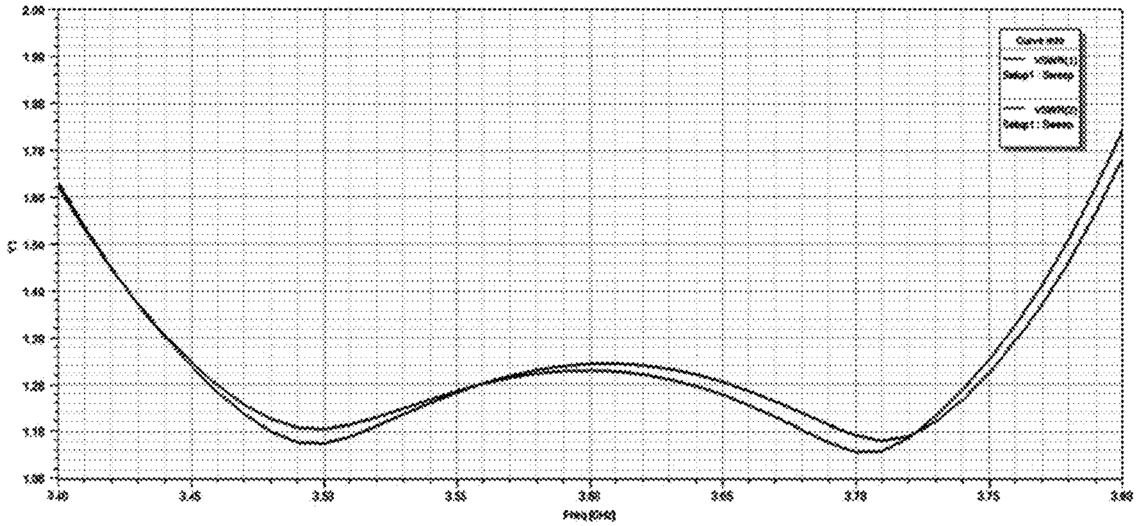
FIG. 24 is a characteristic pattern of a standing wave of the antenna shown in FIG. 23.
Figure 25:
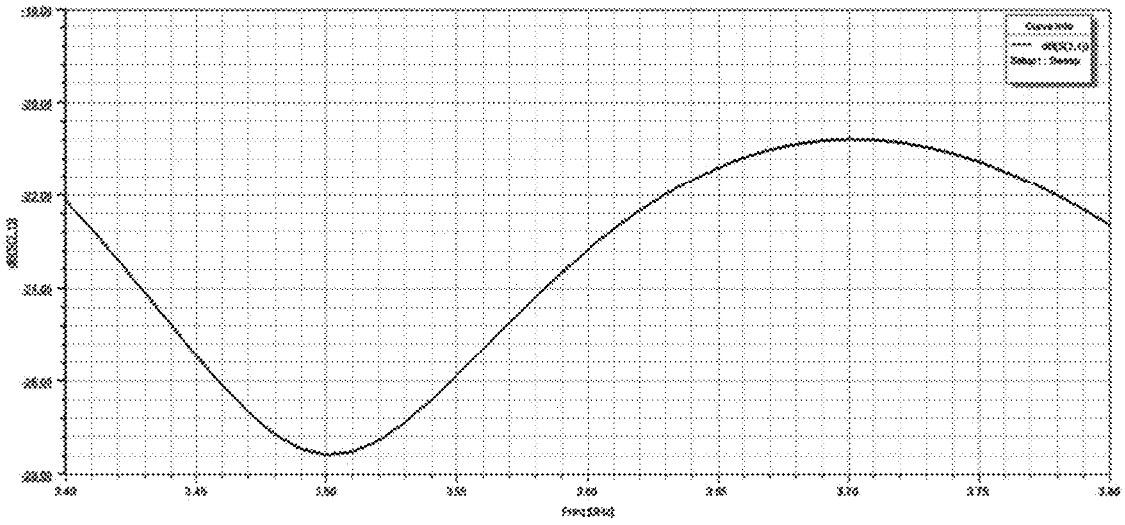
FIG. 25 is a characteristic pattern of an isolation of the antenna shown in FIG. 23.
Figure 26:
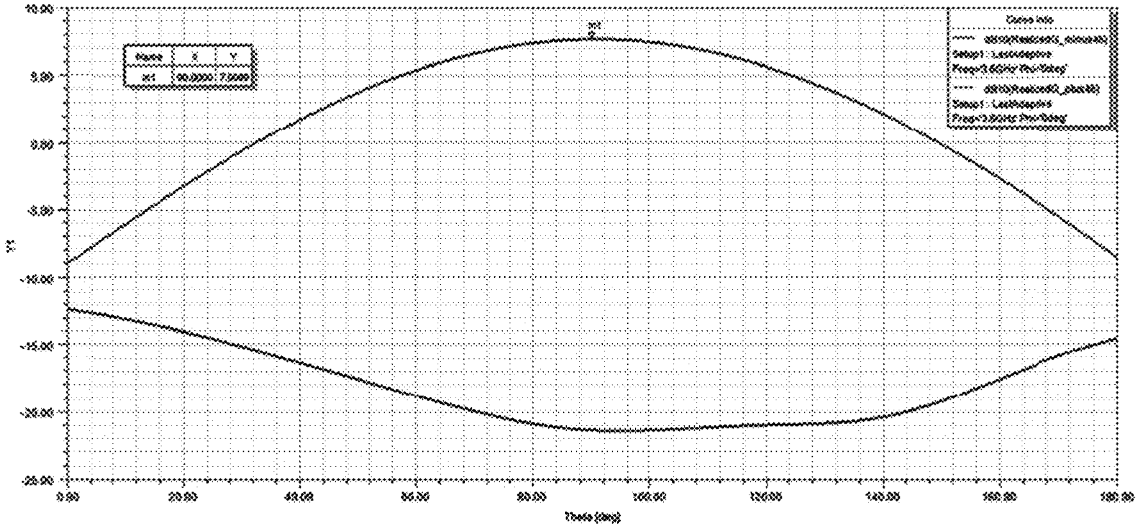
FIG. 26 is a radiation pattern of a horizontal plane and a vertical plane of a center frequency of an antenna according to an embodiment of the present disclosure.

In order to clearly understand the effect of the antenna of the embodiment of the present disclosure, a standing wave ratio, an isolation degree, a radiation gain, and a beam width of the antenna shown in FIG. 21 of the embodiment of the present disclosure are verified through simulation experiments FIG. 24 is a characteristic pattern of a standing wave of the antenna shown in FIG. 21. As shown in FIG. 24, the antenna of the embodiment of the present disclosure has a VSWR lower than 1.75 at a frequency in a range from 3.40 GHz to 3.80 GHz. FIG. 25 is a characteristic pattern of an isolation of the antenna shown in FIG. 21. As shown in FIG. 25, the antenna according to the embodiment of the present disclosure may achieve an in-band isolation degree greater than 20 dB, which effectively improves the resistance to signal crosstalk. FIG. 26 is a radiation pattern of a horizontal plane and a vertical plane of a center frequency of an antenna according to an embodiment of the present disclosure. As shown in FIG. 26, the antenna of the embodiment of the present disclosure has a radiation gain higher than 7.6689 dBi at a center frequency; and further has a greater beam angle and an excellent signal coverage.

In a third aspect, an embodiment of the present disclosure further provides an electronic device including the antenna of any one of the above embodiments. A communication system provided by the embodiment of the present disclosure further includes a transceiver unit, a radio frequency transceiver, a signal amplifier, a power amplifier, and a filtering unit. The antenna in the communication system may be used as a transmitting antenna or a receiving antenna. The transceiver unit may include a baseband and a receiving terminal, where the baseband provides a signal in at least one frequency band, such as 2G signal, 3G signal, 4G signal, 5G signal, or the like; and transmits the signal in the at least one frequency band to the radio frequency transceiver. After the signal is received by an antenna in an antenna system and is processed by the filtering unit, the power amplifier, the signal amplifier, and the radio frequency transceiver, the antenna may transmit the signal to the receiving terminal (such as an intelligent gateway or the like) in the transceiver unit.

Further, the radio frequency transceiver is connected to the transceiver unit and is configured to modulate the signals transmitted by the transceiver unit or demodulate the signals received by the antenna and then transmit the signals to the transceiver unit. Specifically, the radio frequency transceiver may include a transmitting circuit, a receiving circuit, a modulating circuit, and a demodulating circuit. After the transmitting circuit receives multiple types of signals provided by the baseband, the modulating circuit may modulate the multiple types of signals provided by the baseband, and then transmit the modulated signals to the antenna. The signals received by the antenna are transmitted to the receiving circuit of the radio frequency transceiver, and transmitted by the receiving circuit to the demodulating circuit, and demodulated by the demodulating circuit and then transmitted to the receiving terminal.

Further, the radio frequency transceiver is connected to the signal amplifier and the power amplifier, which are in turn connected to the filtering unit connected to at least one antenna. In the process of transmitting signals by the antenna system, the signal amplifier is used for improving a signal-to-noise ratio of the signals output by the radio frequency transceiver and then transmitting the signals to the filtering unit, the power amplifier is used for amplifying the power of the signals output by the radio frequency transceiver and then transmitting the signals to the filtering unit; the filtering unit specifically includes a duplexer and a filtering circuit, the filtering unit combines signals output by the signal amplifier and the power amplifier and filters noise waves and then transmits the signals to the antenna, and the antenna radiates the signals. In the process of receiving signals by the antenna system, the signals received by the antenna are transmitted to the filtering unit, which filters noise waves in the signals received by the antenna and then transmits the signals to the signal amplifier and the power amplifier, and the signal amplifier gains the signals received by the antenna to increase the signal-to-noise ratio of the signals; the power amplifier amplifies the power of the signals received by the antenna. The signals received by the antenna are processed by the power amplifier and the signal amplifier and then transmitted to the radio frequency transceiver, and the radio frequency transceiver transmits the signals to the transceiver unit.

In some examples, the signal amplifier may include various types of signal amplifiers, such as a low noise amplifier, without limitation.

In some examples, the communication system provided by the embodiments of the present disclosure further includes a power management unit connected to the power amplifier to provide the power amplifier with a voltage for amplifying the signal.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. An antenna, comprising: a first dielectric substrate, at least one sub-array and at least one first feed structure; wherein each of the at least one sub-array comprises at least one first radiation portion, at least one transmission component, at least one second feed structure and a reference electrode layer; wherein each of the at least one transmission component comprises at least a first transmission structure and a second transmission structure;

the at least one first radiation portion and the at least one second feed structure are on a side of the first dielectric substrate away from the at least one transmission component, and the reference electrode layer is on a side of the first dielectric substrate close to the at least one transmission component; and each of the at least one first feed structure comprises a first feed port and at least one second feed port; each of the at least one second feed structure comprises a third feed port and at least one fourth feed port;

the reference electrode layer comprises a plurality of first openings and a plurality of second openings therein;

each of the at least one fourth feed port is connected to a corresponding first radiation portion;

orthographic projections of any two of one first opening, one first transmission structure, one second feed port corresponding to each other on the first dielectric substrate overlap with each other; and orthographic projections of any two of one second opening, one second transmission structure, and one third feed port corresponding to each other on the first dielectric substrate overlap with each other, wherein each of the at least one transmission component comprises a phase shifter, which comprises a phase shifting portion connected between the first transmission structure and the second transmission structure; the phase shifting portion of the phase shifter comprises a third dielectric substrate and a fourth dielectric substrate opposite to each other, a first electrode layer on a side of the third dielectric substrate close to the fourth dielectric substrate, a second electrode layer on a side of the fourth dielectric substrate close to the third dielectric substrate, and a liquid crystal layer between the first electrode layer and the second electrode layer;

the third dielectric substrate is closer to the reference electrode layer than the fourth dielectric substrate; and the first electrode layer comprises a first main line and a second main line, and orthographic projections of the first main line and the second main line on the third dielectric substrate overlap with an orthographic projection of the second electrode layer on the third dielectric substrate; and both ends of each of the first main line and the second main line are connected to the first transmission structure and the second transmission structure corresponding to the first main line and the second main line, respectively.

2. The antenna of claim 1, further comprising a second dielectric substrate opposite to the first dielectric substrate, wherein each of the at least one sub-array further comprises at least one second radiation portion on the second dielectric substrate, and orthographic projections of one first radiation portion and one second radiation portion corresponding to each other on the first dielectric substrate at least partially overlap with each other.

3. The antenna of claim 2, wherein the at least one second radiation portion is on a side of the second dielectric substrate away from the first dielectric substrate.

4. The antenna of claim 2, wherein an outline of each first radiation portion comprises at least one first protrusion portion and/or at least one first groove portion, wherein an outline of each second radiation portion comprises at least one second protrusion portion and/or at least one second groove portion;

when the first radiation portion comprises at least one first protrusion portion and the second radiation portion comprises at least one second protrusion portion, the at least one second protrusion portion is in a one-to-one correspondence with the at least one first protrusion portion; and when the first radiation portion comprises at least one first groove portion and the second radiation portion comprises at least one second groove portion, the at least one second groove portion is in a one-to-one correspondence with the at least one first groove portion.

5. The antenna of claim 1, wherein each of the at least one first feed structure is a one-to-two power divider; the antenna comprises a plurality of sub-arrays; and every two sub-arrays arranged side by side along a first direction form a group of sub-arrays; and two second feed ports of the one-to-two power divider are coupled to first transmission structures of two transmission components in a corresponding group of sub-arrays through corresponding first openings, respectively.

6. The antenna of claim 1, wherein each of the at least one sub-array comprises two second feed structures; and fourth feed ports of the two second feed structures connected to a same first radiation portion have different feed directions.

7. The antenna of claim 6, wherein an outline of each first radiation portion comprises a first side and a second side opposite to each other in a first direction, and a third side and a fourth side opposite to each other in a second direction; a main body portion of each of the first side and the second side extends along the second direction, and a main body portion of each of the third side and the fourth side extends along the first direction;

the second side is directly connected to the third side and the fourth side; and two fourth feed ports connected to a same first radiation portion are connected to both ends of the second side, respectively.

8. The antenna of claim 7, wherein the two second feed structures in each sub-array are symmetrically arranged with respect to a straight line extending in the first direction and passing through a midpoint of a second side of an outline of a corresponding first radiation portion as a symmetry axis.

9. The antenna of claim 6, wherein each sub-array comprises two transmission components and two second feed structures; the two transmission components in the sub-array comprise a transmission component a and a transmission component b, respectively, and the two second feed structures comprise a second feed structure a and a second feed structure b, respectively; the reference electrode layer in the sub-array comprises two first openings and two second openings, the two first openings comprise a first opening a and a first opening b, respectively, and the two second openings comprise a second opening a and a second opening b, respectively;

each first feed structure is a one-to-two power divider; the antenna comprises a plurality of sub-arrays, and every two sub-arrays arranged side by side along a first direction form a group of sub-arrays; and each group of sub-arrays are fed by corresponding two first feed structures, and the two first feed structures for feeding a same group of sub-arrays comprise a first feed structure a and a first feed structure b, respectively;

for each group of sub-arrays, two second feed ports of the first feed structure a each are coupled to the first transmission structure of the corresponding transmission component a through the corresponding first opening a; and the second transmission structure of the transmission component a is coupled to the third feed port of the corresponding second feed structure a through the corresponding second openings a; and two second feed ports of the first feed structure b each are coupled to the first transmission structure of the corresponding transmission component b through the corresponding first opening b; the second transmission structure of the transmission component b is coupled to the third feed port of the corresponding second feed structure b through the corresponding second opening b.

10. The antenna of claim 1, wherein each of the first main line and the second main line comprise a first end and a second end opposite to each other; the first transmission structure comprises a first combining line, a first branch line, and a second branch line; the second transmission structure comprises a second combining line, a third branch line, and a fourth branch line;

orthographic projections of the first combining line and the corresponding first opening on the first dielectric substrate overlap with each other; one end of the first branch line is connected to the first end of the first main line, and the other end of the first branch line is connected to the first combining line; one end of the second branch line is connected to the first end of the second main line, and the other end of the second branch line is connected to the first combining line;

orthographic projections of the second combining line and the corresponding second opening on the first dielectric substrate overlap with each other; one end of the third branch line is connected to the second end of the first main line, and the other end of the third branch line is connected to the second combining line; one end of the fourth branch line is connected to the second end of the second main line, and the other end of the fourth branch line is connected to the second combining line; and line lengths of the first branch line and the fourth branch line are identical; line lengths of the second branch line and the third branch line are identical, and the line length of the first branch line is greater than that of the second branch line.

11. The antenna of claim 1, wherein the first transmission structure and the second transmission structure are on the third dielectric substrate.

12. The antenna of claim 1, wherein the number of the at least one first radiation portion of each of the at least one sub-array of the antenna is N, where N≥2, and N is an integer; and each of the least one second feed structure comprises N fourth feed ports, and the N first radiation portions of the sub-array of the antenna are connected to the N fourth feed ports in a one-to-one correspondence.

13. The antenna of claim 1, wherein the at least one first feed structure, the at least one second feed structure and the at least one first radiation portion are in a same layer and are of a same material.

14. The antenna of claim 1, wherein the antenna further comprises a housing; and the at least one sub-array and the at least one first feed structure are within a hollow space of the housing.

15. An electronic device, comprising the antenna of claim 1.

16. An antenna, comprising: a first dielectric substrate, at least one sub-array and at least one first feed structure; wherein each of the at least one sub-array comprises at least one first radiation portion, at least one transmission component, at least one second feed structure and a reference electrode layer; wherein each of the at least one transmission component comprises at least a first transmission structure and a second transmission structure;

the at least one first radiation portion and the at least one second feed structure are on a side of the first dielectric substrate away from the at least one transmission component, and the reference electrode layer is on a side of the first dielectric substrate close to the at least one transmission component; and each of the at least one first feed structure comprises a first feed port and at least one second feed port; each of the at least one second feed structure comprises a third feed port and at least one fourth feed port;

the reference electrode layer comprises a plurality of first openings and a plurality of second openings therein;

each of the at least one fourth feed port is connected to a corresponding first radiation portion;

orthographic projections of any two of one first opening, one first transmission structure, one second feed port corresponding to each other on the first dielectric substrate overlap with each other; and orthographic projections of any two of one second opening, one second transmission structure, and one third feed port corresponding to each other on the first dielectric substrate overlap with each other;

wherein each of the at least one sub-array comprises two second feed structures; and fourth feed ports of the two second feed structures connected to a same first radiation portion have different feed directions;

an outline of each first radiation portion comprises a first side and a second side opposite to each other in a first direction, and a third side and a fourth side opposite to each other in a second direction; a main body portion of each of the first side and the second side extends along the second direction, and a main body portion of each of the third side and the fourth side extends along the first direction;

the second side is directly connected to the third side and the fourth side; and two fourth feed ports connected to a same first radiation portion are connected to both ends of the second side, respectively;

wherein the outline of the first radiation portion further comprises a fifth side connecting the first side and the third side, and a sixth side connecting the first side and the fourth side;

for the outline of the first radiation portion, an intersection point of an extension line of the first side and an extension line of the third side is a first intersection point, and an intersection point of the extension line of the first side and an extension line of the fourth side is a second intersection point; a midpoint of a line connecting a midpoint of the third side and a midpoint of the fourth side is a first midpoint;

a shortest distance from the first intersection point to the fifth side is a first distance, a shortest distance from the second intersection point to the sixth side is a second distance, a distance from the first intersection point to the first midpoint is a third distance, and a distance from the second intersection point to the first midpoint is a fourth distance; and each of a ratio of the first distance to the third distance and a ratio of the second distance to the fourth distance is in a range from 2:15 to 3:14.

17. An antenna, comprising: a first dielectric substrate, at least one sub-array and at least one first feed structure; wherein each of the at least one sub-array comprises at least one first radiation portion, at least one transmission component, at least one second feed structure and a reference electrode layer; wherein each of the at least one transmission component comprises at least a first transmission structure and a second transmission structure;

the at least one first radiation portion and the at least one second feed structure are on a side of the first dielectric substrate away from the at least one transmission component, and the reference electrode layer is on a side of the first dielectric substrate close to the at least one transmission component; and each of the at least one first feed structure comprises a first feed port and at least one second feed port; each of the at least one second feed structure comprises a third feed port and at least one fourth feed port;

the reference electrode layer comprises a plurality of first openings and a plurality of second openings therein;

each of the at least one fourth feed port is connected to a corresponding first radiation portion;

orthographic projections of any two of one first opening, one first transmission structure, one second feed port corresponding to each other on the first dielectric substrate overlap with each other; and orthographic projections of any two of one second opening, one second transmission structure, and one third feed port corresponding to each other on the first dielectric substrate overlap with each other;

wherein each of the at least one sub-array comprises two second feed structures; and fourth feed ports of the two second feed structures connected to a same first radiation portion have different feed directions;

an outline of each first radiation portion comprises a first side and a second side opposite to each other in a first direction, and a third side and a fourth side opposite to each other in a second direction; a main body portion of each of the first side and the second side extends along the second direction, and a main body portion of each of the third side and the fourth side extends along the first direction;

the second side is directly connected to the third side and the fourth side; and two fourth feed ports connected to a same first radiation portion are connected to both ends of the second side, respectively;

wherein the first side is provided with a recess portion thereon and recessed toward the second side.

18. The antenna of claim 17, wherein for each first radiation portion, an angle between the first direction and an extending direction of a line connecting a center of an outline of the recess portion and a midpoint of the second side is in a range from 0° to 5°.

19. The antenna of claim 17, wherein for each first radiation portion, a ratio of a maximum distance to a minimum distance from the first side to the second side in the first direction is in a range from 25:19 to 22:19.

* * * * *